(12) United States Patent
Wiegman

(10) Patent No.: US 11,592,791 B1
(45) Date of Patent: Feb. 28, 2023

(54) SYSTEMS AND METHODS FOR FLIGHT CONTROL SYSTEM USING SIMULATOR DATA

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/474,381

(22) Filed: Sep. 14, 2021

(51) Int. Cl.
| | |
|---|---|
| G05B 13/04 | (2006.01) |
| G06N 20/00 | (2019.01) |
| G05D 1/08 | (2006.01) |
| G05D 3/14 | (2006.01) |

(52) U.S. Cl.
CPC .......... *G05B 13/042* (2013.01); *G05B 13/04* (2013.01); *G05B 13/041* (2013.01); *G05D 1/0825* (2013.01); *G05D 3/1454* (2013.01); *G06N 20/00* (2019.01)

(58) Field of Classification Search
CPC .... G05B 13/042; G05B 13/04; G05B 13/041; G05D 1/0825; G05D 3/1454; G06K 9/6256; G06N 20/00
See application file for complete search history.

(56) References Cited

U.S. PATENT DOCUMENTS

| | | | | |
|---|---|---|---|---|
| 6,317,658 B1* | 11/2001 | Vian | ................. | G05B 13/027 |
| | | | | 701/1 |
| 7,236,914 B1* | 6/2007 | Zyskowski | ............. | G06F 30/20 |
| | | | | 703/8 |
| 7,284,984 B1* | 10/2007 | Zyskowski | ............. | G09B 9/08 |
| | | | | 434/30 |
| 8,812,180 B2* | 8/2014 | Wachenheim | ....... | G08G 5/0039 |
| | | | | 244/175 |
| 10,101,719 B1* | 10/2018 | Kroo | ............ | B64C 39/024 |
| 10,281,890 B1 | 5/2019 | Kroo | | |
| 10,520,389 B2* | 12/2019 | Brandon | .............. | G01M 9/08 |
| 11,017,678 B2* | 5/2021 | Sidiropoulos | ........ | G08G 5/0013 |
| 11,142,333 B1* | 10/2021 | Richter | ............ | G05D 1/0858 |
| 11,427,305 B1* | 8/2022 | Wiegman | ............ | B64C 13/16 |
| 11,465,734 B1* | 10/2022 | Wiegman | ............ | B64D 27/24 |
| 2006/0126608 A1* | 6/2006 | Pereira | ............... | H04L 41/0853 |
| | | | | 370/360 |
| 2010/0318336 A1* | 12/2010 | Falangas | ............... | G06F 30/15 |
| | | | | 703/8 |

(Continued)

*Primary Examiner* — Dale W Hilgendorf
(74) *Attorney, Agent, or Firm* — Caldwell Intellectual Property Law

(57) ABSTRACT

A system for flight control system using simulator data for an electric aircraft is presented. The system includes a computing device, the computing device configured to receive a plurality of measured flight data, simulate a plurality of aircraft performance model outputs as a function of a flight simulator and the plurality of measured flight data, determine a moment datum as a function of the plurality of measured flight data and the plurality of aircraft performance model outputs, generate an allocation command datum as a function of the moment datum and the plurality of aircraft performance model outputs, and perform a torque allocation on a flight component of a plurality of flight components as a function of the allocation command and the moment datum.

18 Claims, 11 Drawing Sheets

(56) References Cited

U.S. PATENT DOCUMENTS

| | | | |
|---|---|---|---|
| 2011/0184591 A1* | 7/2011 | Kordt | G05D 1/0825 701/3 |
| 2013/0325220 A1* | 12/2013 | Gardes | B64D 43/02 701/14 |
| 2016/0091894 A1* | 3/2016 | Zhang | G05D 1/0044 701/2 |
| 2016/0236790 A1* | 8/2016 | Knapp | G08G 5/0052 |
| 2016/0376003 A1* | 12/2016 | Feldman | B64C 31/02 703/2 |
| 2017/0046968 A1* | 2/2017 | Gato | G09B 9/206 |
| 2017/0068252 A1* | 3/2017 | Yu | G05D 1/0858 |
| 2017/0243505 A1* | 8/2017 | Dimock | G09B 9/12 |
| 2017/0301247 A1* | 10/2017 | Sherry | G08G 5/0021 |
| 2017/0323274 A1* | 11/2017 | Johnson | G05B 13/041 |
| 2018/0305033 A1* | 10/2018 | Joubert | G05D 1/0825 |
| 2020/0031461 A1* | 1/2020 | Mahboubi | G05D 1/0858 |
| 2020/0117580 A1* | 4/2020 | Lekivetz | G06V 10/82 |
| 2020/0290742 A1* | 9/2020 | Kumar | B64D 27/10 |
| 2021/0141986 A1* | 5/2021 | Ganille | G06K 9/6262 |
| 2021/0390455 A1* | 12/2021 | Schierz | G06N 5/04 |
| 2022/0026895 A1* | 1/2022 | Leitch | G06N 20/00 |
| 2022/0027762 A1* | 1/2022 | Leitch | G05B 23/0235 |

* cited by examiner

SYSTEMS AND METHODS FOR FLIGHT CONTROL SYSTEM USING SIMULATOR DATA

FIELD OF THE INVENTION

The present invention generally relates to the field of flight control. In particular, the present invention is directed to systems and methods for flight control system using simulator data.

BACKGROUND

Flight control systems typically use simulator models and/or data derived from such models to control aircraft actuators, such as propeller, lifts fans and other vertical flight rotors, ailerons, elevators, flaps, rudders, and the like during flight. The simulator model represents the aircraft and its geometry, including actuators and their location relative to other structures; aerodynamic surfaces such as wings, tails, stabilizers, etc.; and the aerodynamic effect of other structures, such as the fuselage, pylons, etc. For a complicated aircraft, for example, having many actuators, a single simulation may take three days to run on hundreds of processors. Thousands of such simulations may need to be run to generate an ideal simulator model that is comprehensive enough to provide a command for a pilot to control each component of the aircraft.

SUMMARY OF THE DISCLOSURE

In an aspect a system for flight control system using simulator data for an electric aircraft is presented. The system includes a computing device, the computing device configured to receive a plurality of measured flight data, simulate a plurality of aircraft performance model outputs as a function of a flight simulator and the plurality of measured flight data, determine a moment datum as a function of the plurality of measured flight data and the plurality of aircraft performance model outputs, generate an allocation command datum as a function of the moment datum and the plurality of aircraft performance model outputs, and perform a torque allocation on a flight component of a plurality of flight components as a function of the allocation command and the moment datum.

In another aspect a method for flight control system using simulator data for an electric aircraft is presented. The method includes, receiving, by a computing device, a plurality of measured flight data, simulating, by a flight simulator, a plurality of aircraft performance model outputs as a function of the plurality of measured flight data, determining a moment datum as a function of the plurality of measured flight data and the plurality of aircraft performance model outputs, generating an allocation command datum as a function of the moment datum and the plurality of aircraft performance model outputs, and performing a torque allocation on a flight component of a plurality of flight components as a function of the allocation command and the moment datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
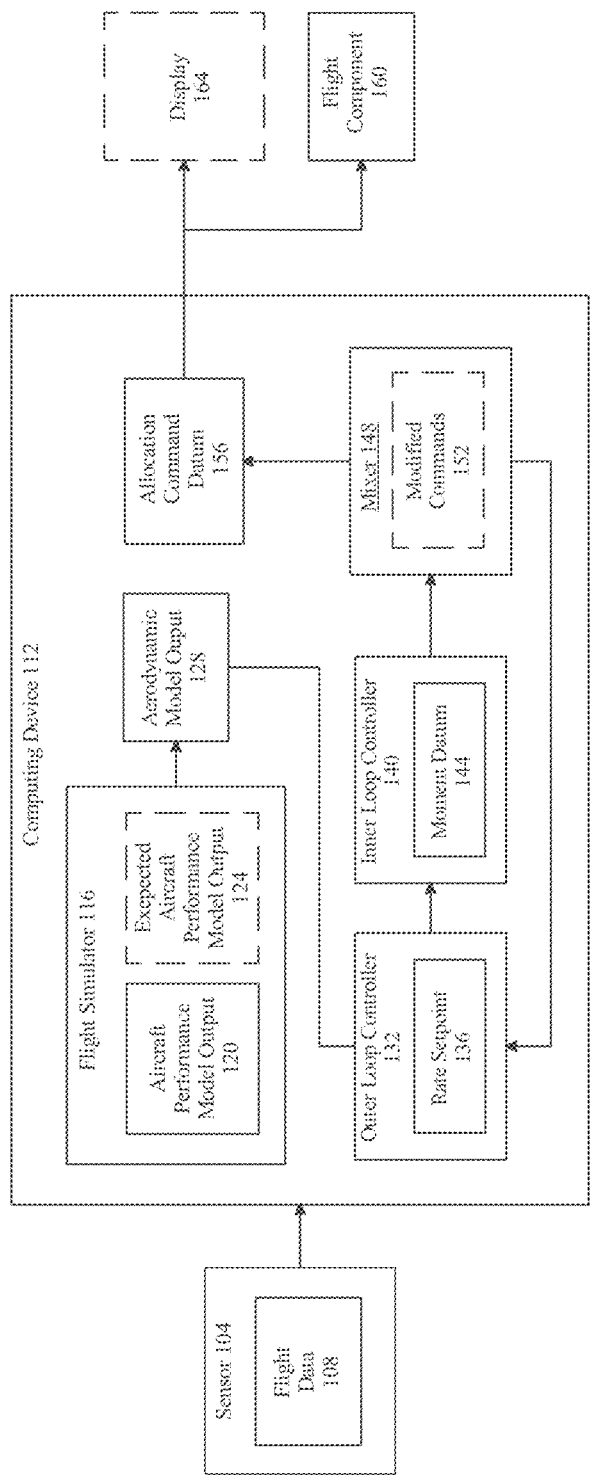
FIG. 1 is an exemplary embodiment of a system for flight control system using simulator data for an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for flight control system using simulator data for an electric aircraft. In an embodiment, aspects of the present disclosure can be used for an electric vertical take-off and landing (eVTOL) aircraft. In an embodiment, aspects of the present disclosure can be used to generate a plurality of simulations which may be used to generate an aerodynamic simulation that can be used to generate a set of commands for the electric aircraft to follow.

Aspects of the present disclosure can be used to generate a plurality of simulations in which a flight control system can select an optimal simulation to mimic. Aspects of the present disclosure can also be used to provide a lookup table used by the flight control system to determine the effectiveness of actuators under given operating conditions and operational states of the respective actuators comprising the aircraft based on a simulation. In some embodiments, the flight control system uses the lookup table to determine an optimal set of actuators and associated parameters (e.g., RPM, angle, etc., as applicable) to achieve a set of forces and moments determined to achieve an objective, e.g., to respond to inputs received via one or more manual flight control devices (inceptors), or other flight directives, such as inputs received from an auto-pilot In various embodiments, a flight control system as disclosed herein embodies and/or is based on data derived from a comprehensive aerodynamic model generated on a sparse set of simulation data. In some embodiments, simulations are performed for each of a plurality of actuators independently of one or more of the other actuators. For example, in some embodiments, each actuator is cycled through a range of actuator operating parameters (e.g., RPM in the case of an electric lift fan or other rotor) in a range of operating conditions (e.g., aircraft attitude, wind direction, etc.) while keeping other actuators constant. In an embodiment, a baseline model may be selected or generated based on the per-actuator simulation data and is used in various embodiments to determine interactions between actuators for a very limited set of operating conditions. Interaction values for other operating conditions are determined by interpolation. The interaction terms are combined with the baseline model to generate a comprehensive aerodynamic model. Exemplary embodiments illustrating aspects of the present disclosure are described below in the context of several specific examples.

Referring now to FIG. 1, an exemplary embodiment of a system 100 for flight control system using simulator data for an electric aircraft is illustrated. System 100 includes computing device 112. In a non-limiting embodiment, computing device 112 may include a flight controller. Computing device 112 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 112 may include a single computing device operating independently, or may include two or more computing device operating in concert, in parallel, sequentially or the like; two or more computing devices may be included together in a single computing device or in two or more computing devices. Computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 112 may include but is not limited to, for example, a computing device or cluster of computing devices in a first location and a second computing device or cluster of computing devices in a second location. computing device 112 may include one or more computing devices dedicated to data storage, security, distribution of traffic for load balancing, and the like. computing device 112 may distribute one or more computing tasks as described below across a plurality of computing devices of computing device, which may operate in parallel, in series, redundantly, or in any other manner used for distribution of tasks or memory between computing devices. computing device 112 may be implemented using a "shared nothing" architecture in which data is cached at the worker, in an embodiment, this may enable scalability of system 100 and/or computing device.

With continued reference to FIG. 1, computing device 112 may be designed and/or configured to perform any method, method step, or sequence of method steps in any embodiment described in this disclosure, in any order and with any degree of repetition. For instance, computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1 computing device 112 and/or flight controller may be controlled by one or more Proportional-Integral-Derivative (PID) algorithms driven, for instance and without limitation by stick, rudder and/or thrust control lever with analog to digital conversion for fly by wire as described herein and related applications incorporated herein by reference. A "PID controller", for the purposes of this disclosure, is a control loop mechanism employing feedback that calculates an error value as the difference between a desired setpoint and a measured process variable and applies a correction based on proportional, integral, and derivative terms; integral and derivative terms may be generated, respectively, using analog integrators and differentiators constructed with operational amplifiers and/ or digital integrators and differentiators, as a non-limiting example. A similar philosophy to attachment of flight control systems to sticks or other manual controls via pushrods and wire may be employed except the conventional surface servos, steppers, or other electromechanical actuator components may be connected to the cockpit inceptors via electrical wires. Fly-by-wire systems may be beneficial when considering the physical size of the aircraft, utility of for fly by wire for quad lift control and may be used for remote and autonomous use, consistent with the entirety of this disclosure. Computing device 112 may harmonize vehicle flight dynamics with best handling qualities utilizing the minimum amount of complexity whether it be additional modes, augmentation, or external sensors as described herein.

With continued reference to FIG. 1, computing device 112 may be configured to receive plurality of measured flight data 108. A "plurality of measured flight data," for the purpose of this disclosure, is any element of data describing parameters captured by sensor 104 such as the outside environment and physical values describing the performance or qualities of flight components of the electric aircraft. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor 104 may include circuitry, computing devices, electronic components or a combination thereof that translates a plurality of datum into at least an electronic signal configured to be transmitted to another electronic component. In a non-limiting embodiment, plurality of measured flight data 108 may include any datum describing the components that factor into the operation of a vehicle. In a non-limiting embodiment, plurality of measured flight data 108 may include a plurality of histories, records, projections, and the like thereof, regarding the operation of the vehicle. In a non-limiting embodiment, plurality of measured flight data 108 may include a plurality of records, reports, logs, and the like thereof, describing the performance history of the vehicle. In a non-limiting embodiment, plurality of measured flight data 108 may include information describing, but not limited to, vehicle personnel, vehicle capabilities, and the like thereof. In a non-limiting embodiment, plurality of measured flight data 108 may include information describing the maintenance, repair, and overhaul of a vehicle or a vehicle's components. In a non-limiting embodiment, plurality of measured flight data 108 may include a record of maintenance activities and their results including a plurality of tests, measurements, replacements, adjustments, repairs, and the like, that may be intended to retain and/or restore a functional unit of a vehicle. Plurality of measured flight data 108 may include a record of data of, but not limited to, functional checks, servicing, repairing or replacing of necessary devices, equipment, machinery, and the like, pertaining to the vehicle. In a non-limiting embodiment, plurality of measured flight data 108 may include a unique identification number denoting a part of a vehicle that was installed, repaired, or replaced as a function of a maintenance. In a non-limiting embodiment, plurality of measured flight data 108 may include a record of maintenance and/or repair schedules corresponding to a vehicle. The plurality of measured aircraft operation datum may include a record of potential maintenance and repair schedules corresponding to a vehicle. A "maintenance schedule," for the purposes of this disclosure, refer to an appointment reserved for an aircraft for a maintenance or repair to be conducted upon. Plurality of measured flight data 108 may include any confidential information and/or data describing a vehicle and its operation. For example and without limitation, plurality of measured flight data 108 may include information classified by different level of confidentiality for specific users with different level of authority and/or access to confidential information. For example and without limitation, plurality of measured flight data 108 may include detailed information about the history and or background of a pilot of a vehicle which may be classified with a high classification label in which a user with a high classification label may access such information. For example and without limitation, information about flight destination, arrival, flight time, and the like thereof may be assigned a low classification label which may be available to any user with a low classification label and above. Persons skilled in the art, upon reviewing the entirety of this disclosure, will be aware of the various levels of information describing an electric aircraft as disclosed in the entirety of this disclosure.

With continued reference to FIG. 1, plurality of measured flight data 108 may include a flight component state data. A "flight component state data," for the purposes of this disclosure, refer to any datum that represents the status or health status of a flight component or any component of an electric aircraft. The flight component state data of a plurality of flight components. "Flight components", for the purposes of this disclosure, includes components related to, and mechanically connected to an aircraft that manipulates a fluid medium in order to propel and maneuver the aircraft through the fluid medium. In a non-limiting embodiment, the operation of the aircraft through the fluid medium will be discussed at greater length hereinbelow. In a non-limiting embodiment, the flight component state data may include a plurality of state information of a plurality of flight components of the electric aircraft. A state information of the plurality of state information of the plurality of aircraft components may include an aircraft flight duration, a distance of the aircraft flight, a plurality of distances of an aircraft from the surface, and the like. The flight component state data may denote a location of the aircraft, status of the aircraft such as health and/or functionality, aircraft flight time, aircraft on frame time, and the like thereof. In a non-limiting embodiment, the flight component state data may include aircraft logistics of an electric aircraft of a plurality of electrical aircraft With continued reference to FIG. 1, plurality of measured flight data 108 may include sensor datum. A "sensor datum," for the purpose of this disclosure, is any datum or element of data describing parameters captured by sensor 104 describing the outside environment and physical values describing the performance or qualities of flight components of the electric aircraft. In a non-limiting embodiment, sensor datum may include any data captured by any sensor as described in the entirety of this disclosure. Additionally and alternatively, sensor datum may include any element or signal of data that represents an electric aircraft route and various environmental or outside parameters. In a non-limiting embodiment, sensor datum may include an element of that representing the safest, most efficient, shortest, or a combination thereof, flight path. In a non-limiting embodiment, sensor datum may include a degree of torque that may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like.

With continued reference to FIG. 1, plurality of measured flight data 108 may include an input datum. An "input datum," for the purpose of this disclosure, is any datum or element of data identifying and/or a pilot input or command. The input datum may include a manipulation of one or more pilot input controls as described above that correspond to a desire to affect an aircraft's trajectory as a function of the movement of one or more flight components and one or more propulsors, alone or in combination. "Flight components", for the purposes of this disclosure, includes components related to, and mechanically connected to an aircraft that manipulates a fluid medium in order to propel and maneuver the aircraft through the fluid medium. The operation of the aircraft through the fluid medium will be discussed at greater length hereinbelow. In a non-limiting embodiment, the input datum may include information gathered by one or more sensors. At least a pilot control may be communicatively connected to any other component presented in system, the communicative connection may include redundant connections configured to safeguard against single-point failure. Pilot input may indicate a pilot's desire to change the heading or trim of an electric aircraft. Pilot input may indicate a pilot's desire to change an aircraft's pitch, roll, yaw, or throttle. Aircraft trajectory is manipulated by one or more control surfaces and propulsors working alone or in tandem consistent with the entirety of this disclosure, hereinbelow. Pitch, roll, and yaw may be used to describe an aircraft's attitude and/or heading, as they correspond to three separate and distinct axes about which the aircraft may rotate with an applied moment, torque, and/or other force applied to at least a portion of an aircraft. "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Pilot input, when referring to throttle, may refer to a pilot's desire to increase or decrease thrust produced by at least a propulsor. In a non-limiting embodiment, input datum may include an electrical signal. In a non-limiting embodiment, input datum may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least sensor 104 may include circuitry, computing devices, electronic components or a combination thereof that translates pilot input into input datum 108 configured to be transmitted to any other electronic component.

With continued reference to FIG. 1, the plurality of measured aircraft datum may include a flight datum. A "flight datum," for the purpose of this disclosure, is any datum or element of data describing physical parameters of individual actuators and/or flight components of an electric aircraft or logistical parameters of the electric aircraft. In a non-limiting embodiment, flight datum may include a plurality of data describing the health status of an actuator of a plurality of actuators. In a non-limiting embodiment, the plurality of data may include a plurality of failure data for a plurality of actuators. In a non-limiting embodiment, safety datum may include a measured torque parameter that may include the remaining vehicle torque of a flight component among a plurality of flight components. A "measured torque parameter," for the purposes of this disclosure, refer to a collection of physical values representing a rotational equivalence of linear force. A person of ordinary skill in the art, after viewing the entirety of this disclosure, would appreciate the various physical factors in measuring torque of an object. For instance and without limitation, remaining vehicle torque may be consistent with disclosure of remaining vehicle torque in U.S. Pat. No. 11,142,333, filed on Mar. 10, 2021, and titled "SYSTEM AND METHOD FOR FLIGHT CONTROL IN ELECTRIC AIRCRAFT", which is incorporated herein by reference in its entirety. Remaining vehicle torque may include torque available at each of a plurality of flight components at any point during an aircraft's entire flight envelope, such as before, during, or after a maneuver. For example, and without limitation, torque output may indicate torque a flight component must output to accomplish a maneuver; remaining vehicle torque may then be calculated based on one or more of flight component limits, vehicle torque limits, environmental limits, or a combination thereof. Vehicle torque limit may include one or more elements of data representing maxima, minima, or other limits on vehicle torques, forces, attitudes, rates of change, or a combination thereof. Vehicle torque limit may include individual limits on one or more flight components, structural stress or strain, energy consumption limits, or a combination thereof. Remaining vehicle torque may be represented, as a non-limiting example, as a total torque available at an aircraft level, such as the remaining torque available in any plane of motion or attitude component such as pitch torque, roll torque, yaw torque, and/or lift torque. In a non-limiting embodiment, computing device 112 may mix, refine, adjust, redirect, combine, separate, or perform other types of signal operations to translate pilot desired trajectory into aircraft maneuvers. In a nonlimiting embodiment a pilot may send a pilot input at a press of a button to capture current states of the outside environment and subsystems of the electric aircraft to be displayed onto an output device in pilot view. The captured current state may further display a new focal point based on that captured current state. In a non-limiting embodiment, computing device 112 may condition signals such that they can be sent and received by various components throughout the electric vehicle. In a non-limiting embodiment, flight datum may include at least an aircraft angle. At least an aircraft angle may include any information about the orientation of the aircraft in three-dimensional space such as pitch angle, roll angle, yaw angle, or some combination thereof. In non-limiting examples, at least an aircraft angle may use one or more notations or angular measurement systems like polar coordinates, cartesian coordinates, cylindrical coordinates, spherical coordinates, homogenous coordinates, relativistic coordinates, or a combination thereof, among others. In a non-limiting embodiment, flight datum may include at least an aircraft angle rate. At least an aircraft angle rate may include any information about the rate of change of any angle associated with an electrical aircraft as described herein. Any measurement system may be used in the description of at least an aircraft angle rate. Persons skilled in the art, upon reviewing the entirety of this disclosure, will be aware of the various geometric parameters for purposes as described in the entirety of this disclosure.

With continued reference to FIG. 1, computing device 112 may receive plurality of measured flight data 108 from sensor 104. A "sensor," for the purposes of this disclosure, is an electronic device configured to detect, capture, measure, or combination thereof, a plurality of external and electric vehicle component quantities. Sensor 104 may be integrated and/or connected to at least an actuator, a portion thereof, or any subcomponent thereof. Sensor 104 may include a photodiode configured to convert light, heat, electromagnetic elements, and the like thereof, into electrical current for further analysis and/or manipulation. Sensor 104 may include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The plurality of datum captured by sensor 104 may include circuitry, computing devices, electronic components or a combination thereof that translates into at least an electronic signal configured to be transmitted to another electronic component. Sensor 104 may be disposed on at least an actuator of the electric aircraft. An "actuator," for the purpose of this disclosure, is any flight component or any part of an electric aircraft that helps it to achieve physical movements by converting energy, often electrical, air, or hydraulic, into mechanical force and enable movement. "Disposed," for the purpose of this disclosure, is the physical placement of a computing device on an actuator. In a non-limiting embodiment, actuator may include a flight component. In a non-limiting embodiment, sensor 104 may include a plurality of individual sensors disposed on each actuator of the electric aircraft. In a non-limiting embodiment, sensor 104 may be mechanically and communicatively connected to one or more throttles. The throttle may be any throttle as described herein, and in non-limiting examples, may include pedals, sticks, levers, buttons, dials, touch screens, one or more computing devices, and the like. Additionally, a right-hand floor-mounted lift lever may be used to control the amount of thrust provided by the lift fans or other propulsors. The rotation of a thumb wheel pusher throttle may be mounted on the end of this lever and may control the amount of torque provided by the pusher motor, or one or more other propulsors, alone or in combination. Any throttle as described herein may be consistent with any throttle described in U.S. patent application Ser. No. 16/929, 206 and titled, "Hover and Thrust Control Assembly for Dual-Mode Aircraft", which is incorporated herein in its entirety by reference. Sensor 104 may be mechanically and communicatively connected to an inceptor stick. The pilot input may include a left-hand strain-gauge style STICK for the control of roll, pitch and yaw in both forward and assisted lift flight. A 4-way hat switch on top of the left-hand stick enables the pilot to set roll and pitch trim. Inceptor stick may include any inceptor stick as described in the entirety of this disclosure. Persons skilled in the art, upon reviewing the entirety of this disclosure, will be aware various embodiments and functions of a pilot input and inceptor stick for purposes as described herein.

Still referring to FIG. 1, computing device 112 may include an aircraft control located within system 100. As used in this disclosure an "aircraft control" is a control and/or guidance system that maneuvers the aircraft. In an embodiment, the aircraft control may include a mechanical and/or manually operated flight control system. For example, and without limitation the aircraft control may include a collective control. As used in this disclosure a "collective control" is a mechanical control of an aircraft that allows a pilot and/or other operator to adjust and/or control the pitch angle of aircraft. For example and without limitation, collective control may alter and/or adjust a pitch angle of all the main rotor blades collectively. For example, and without limitation the aircraft control may include a yoke control. As used in this disclosure a "yoke control" is a mechanical control of an aircraft to control the pitch and/or roll. For example and without limitation, yoke control may alter and/or adjust the roll angle of aircraft as a function of controlling and/or maneuvering ailerons. In an embodiment, the aircraft control may include one or more foot brakes, control sticks, pedals, throttle levels, and the like thereof. Additionally or alternatively, the aircraft control may be configured to translate a desired command from plurality of measured flight data 108. As used in this disclosure a "desired command" is a direction and/or command that a pilot desires, wishes, and/or wants for a flight component. In an embodiment, and without limitation, desired command may include a desired torque for a flight component. For example, and without limitation, the aircraft control may translate that a desired torque for a propeller be 160 lb. ft. of torque. As a further non-limiting example, the aircraft control may translate that a pilot's desired torque for a propulsor be 290 lb. ft. of torque. In another embodiment, the aircraft control may include a digital and/or automated flight control system. For example, and without limitation, the aircraft control may include a computing device and/or flight controller capable of producing an autonomous function. Persons skilled in the art, upon reviewing the entirety of this disclosure, will be aware of the various embodiments of an aircraft control for the purposes as described in the entirety of this disclosure.

Referring still to FIG. 1, sensor 104 may be mechanically and communicatively connected to a foot pedal. In a non-limiting embodiment, system 100 may incorporate wheeled landing gear steerable by differential braking accessed by floor mounted pedals; in the event of installing such a foot actuated "caveman" infrastructure, yaw control also may be affected through differential foot pressure. A stick may be calibrated at zero input (relaxed state) and at the stops in pitch and roll. The calibration may be done in both directions of roll and both directions of pitch. Any asymmetries may be handled by a bilinear calibration with the breakpoint at the neutral point. Likewise, a yaw zero point may correspond to a relaxed state of an inceptor stick. The full-scale torque in each twist direction may be independently calibrated to the maximum torque seen in the calibration process in that direction. In all phases of flight, the control surface deflections may be linearly mapped to their corresponding maximum stick deflections and neutral position. In the case of roll, where there may be more aileron deflection in the trailing edge up direction, the degrees of deflection per pilot input unit may be different in each direction, such that full surface deflection may be not reached until full stick deflection. When the lift fans are engaged, the pilot's stick inputs may correspond to roll and pitch attitude (+/−30 deg) and yaw rate (+/−60 deg/second) commands, which are also linearly mapped to the full range of stick travel. A breakout force of 2-3 Newtons (0.5 lbf minimums mil spec 1797 min breakout force) measured at center of stick grip position may be applied prior to the linear mapping. Breakout force prevents adverse roll yaw coupling. In order to remove the need for constant control input in steady forward flight, pitch and roll trim may be available. Pitch trim may be limited to +7 deg pitch up trim and −5 deg pitch down trim, which may be sufficient to trim for level flight over the entire center of gravity and cruise airspeed range in non-limiting examples. Roll trim limited to 2 degrees (average between the ailerons) may be also available. The trim may be applied after the breakout force to change the input that center stick corresponds to. This trimmed command applies to both the attitude commands when the lift rotors are powered, and the control surface deflections at all times. In order to ensure the pilot can always access the full capability of the aircraft, the mapping below from pre-trim input to post-trim input may be used when trim is nonzero. Note that with positive trim, the effective sensitivity in the positive direction has decreased while the sensitivity in the negative direction has increased. This is a necessary byproduct of enforcing the constraint that full stick deflection yields full control surface deflection. The lift lever has very low additional breakout torque and requires a constant (but adjustable) torque of 3.1 Nm during movement, which translates to 2 lbf at the intended grip position. Control of the lift motors may be only active when the assisted lift lever may be raised above 3.75 degrees from the full down stop (out of 25 degrees total). This may represent a debounce mechanism that may be determined based on the friction of the assisted lift lever, the mass and the expected cockpit vibration levels. A mechanical detent may be installed on the lift lever at an angle corresponding to 15% average torque in order to provide kinesthetic feedback to the pilot of the minimum lift lever setting which provides adequate control authority via the lift fans.

With continued reference to FIG. 1, sensor 104 may include a motion sensor. A "motion sensor", for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 104 may include, but not limited to, torque sensor, gyroscope, accelerometer, magnetometer, inertial measurement unit (IMU), pressure sensor, force sensor, proximity sensor, displacement sensor, vibration sensor, LIDAR sensor, and the like. In a non-limiting embodiment sensor 104 ranges may include a technique for the measuring of distances or slant range from an observer including sensor 104 to a target which may include a plurality of outside parameters. "Outside parameter," for the purposes of this disclosure, refer to environmental factors or physical electric vehicle factors including health status that may be further be captured by a sensor 104. Outside parameter may include, but not limited to air density, air speed, true airspeed, relative airspeed, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of the electric aircraft itself including, but not limited to, remaining fuel or battery. Outside parameter may include at least an environmental parameter. Environmental parameter may be any environmentally based performance parameter as disclosed herein. Environment parameter may include, without limitation, time, pressure, temperature, air density, altitude, gravity, humidity level, airspeed, angle of attack, and debris, among others. Environmental parameters may be stored in any suitable datastore consistent with this disclosure. Environmental parameters may include latitude and longitude, as well as any other environmental condition that may affect the landing of an electric aircraft. Technique may include the use of active range finding methods which may include, but not limited to, light detection and ranging (LIDAR), radar, sonar, ultrasonic range finding, and the like. In a non-limiting embodiment, sensor 104 may include at least a LIDAR system to measure ranges including variable distances from sensor 104 to a potential landing zone or flight path. LIDAR systems may include, but not limited to, a laser, at least a phased array, at least a microelectromechanical machine, at least a scanner and/or optic, a photodetector, a specialized GPS receiver, and the like. In a non-limiting embodiment, sensor 104 including a LIDAR system may targe an object with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment the LIDAR system may include a topographic LIDAR and a bathymetric LIDAR, wherein the topographic LIDAR that may use near-infrared laser to map a plot of a land or surface representing a potential landing zone or potential flight path while the bathymetric LIDAR may use water-penetrating green light to measure seafloor and various water level elevations within and/or surrounding the potential landing zone. In a non-limiting embodiment, electric aircraft may use at least a LIDAR system as a means of obstacle detection and avoidance to navigate safely through environments to reach a potential landing zone. Sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor.

With continued reference to FIG. 1, sensor 104 may further include a sensor suite. One or more sensors may be communicatively connected to at least a pilot control, the manipulation of which, may constitute at least an aircraft command. "Communicative connecting", for the purposes of this disclosure, refers to two or more components electrically, or otherwise connected and configured to transmit and receive signals from one another. Signals may include electrical, electromagnetic, visual, audio, radio waves, or another undisclosed signal type alone or in combination. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor 104 may include circuitry, computing devices, electronic components or a combination thereof that translates input datum 108 into at least an electronic signal configured to be transmitted to another electronic component. At least a sensor communicatively connected to at least a pilot control may include a sensor disposed on, near, around or within at least pilot control.

Further referring to FIG. 1, at least pilot control may be physically located in the cockpit of the aircraft or remotely located outside of the aircraft in another location communicatively connected to at least a portion of the aircraft. "Communicatively connection", for the purposes of this disclosure, is a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. At least pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, or be connected to sensor 104.

In an embodiment, and still referring to FIG. 1, sensor 104 may be attached to one or more pilot inputs and attached to one or more pilot inputs, one or more portions of an aircraft, and/or one or more structural components, which may include any portion of an aircraft as described in this disclosure. As used herein, a person of ordinary skill in the art would understand "attached" to mean that at least a portion of a device, component, or circuit is connected to at least a portion of the aircraft via a mechanical connection. Said mechanical connection can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling can be used to join two pieces of rotating electric aircraft components. Control surfaces may each include any portion of an aircraft that can be moved or adjusted to affect altitude, airspeed velocity, groundspeed velocity or direction during flight. For example, control surfaces may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, control surfaces may include a rudder, which may include, without limitation, a segmented rudder. The rudder may function, without limitation, to control yaw of an aircraft. Also, control surfaces may include other flight control surfaces such as propulsors, rotating flight controls, or any other structural features which can adjust the movement of the aircraft. A "control surface" as described herein, is any form of a mechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, a combination thereof, or any other mechanical surface are used to control an aircraft in a fluid medium. Persons skilled in the art, upon reviewing the entirety of this disclosure, will be aware of various mechanical linkages that may be used as a control surface, as used and described in this disclosure.

Still referring to FIG. 1, sensor 104 may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. At least a sensor may be configured to detect pilot input from at least pilot control. At least pilot control may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety.

With continued reference to FIG. 1, sensor 104 may be configured transmit plurality of measured flight data to computing device 112. In a non-limiting embodiment, computing device 112 may include a plurality of physical controller area network buses communicatively connected to the aircraft and sensor 104. A "physical controller area network bus," as used in this disclosure, is vehicle bus unit including a central processing unit (CPU), a CAN controller, and a transceiver designed to allow devices to communicate with each other's applications without the need of a host computer which is located physically at the aircraft. Physical controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks. For instance and without limitation, CAN bus unit may be consistent with disclosure of CAN bus unit in U.S. Pat. No. 11,196,585, filed on Mar. 21, 2021, and titled "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated herein by reference in its entirety. In a non-limiting embodiment, the computing device 112 may receive plurality of measured flight data 108 from the sensor 104 by a physical CAN bus unit. In a non-limiting embodiment, the sensor 104 may include a physical CAN bus unit to detect plurality of measured flight data 108 in tandem with a plurality of individual sensors from a sensor suite. Physical CAN bus unit may include multiplex electrical wiring for transmission of multiplexed signaling. Physical CAN bus unit may include message-based protocol(s), wherein the invoking program sends a message to a process and relies on that process and its supporting infrastructure to then select and run appropriate programing. A plurality of physical CAN bus units may be located physically at the aircraft may include mechanical connection to the aircraft, wherein the hardware of the physical CAN bus unit is integrated within the infrastructure of the aircraft.

With continued reference to FIG. 1, computing device 112 may be configured to simulate a plurality of aircraft performance model outputs 120 as a function of flight simulator 116 and plurality of measured flight data 108. A "flight simulator," for the purpose of this disclosure, is a program or set of operations that simulate flight. In some cases, flight simulator may simulate flight within an environment, for example an environmental atmosphere in which aircraft fly, airports at which aircraft take-off and land, and/or mountains and other hazards aircraft attempt to avoid crashing into. For instance and without limitation, flight simulator may be consistent with flight simulator in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT," which is incorporated herein by reference in its entirety. In some cases, an environment may include geographical, atmospheric, and/or biological features. In some cases, flight simulator 116 may model an artificial and/or virtual aircraft in flight as well as an environment in which the artificial and/or virtual aircraft flies. In some cases, flight simulator 116 may include one or more physics models, which represent analytically or through data-based, such as without limitation machine-learning processes, physical phenomenon. Physical phenomenon may be associated with an aircraft and/or an environment. For example, some versions of flight simulator 116 may include thermal models representing aircraft components by way of thermal modeling. Thermal modeling techniques may, in some cases, include analytical representation of one or more of convective hear transfer (for example by way of Newton's Law of Cooling), conductive heat transfer (for example by way of Fourier conduction), radiative heat transfer, and/or advective heat transfer. In some cases, flight simulator 116 may include models representing fluid dynamics. For example, in some embodiments, flight simulator may include a representation of turbulence, wind shear, air density, cloud, precipitation, and the like. In some embodiments, flight simulator 116 may include at least a model representing optical phenomenon. For example, flight simulator 116 may include optical models representative of transmission, reflectance, occlusion, absorption, attenuation, and scatter. Flight simulator 116 may include non-analytical modeling methods; for example, the flight simulator may include, without limitation, a Monte Carlo method for simulating optical scatter within a turbid medium, for example clouds. In some embodiments, flight simulator 116 may represent Newtonian physics, for example motion, pressures, forces, moments, and the like. An exemplary flight simulator may include MICROSOFT® Flight Simulator from MICROSOFT® of Redmond, Wash., U.S.A.

With continued reference to FIG. 1, computing device 112 may be configured to simulate aircraft performance model output 120 of a plurality of aircraft performance model outputs. An "aircraft performance model output," for the purpose of this disclosure, is any simulation and/or model of a vehicle such as, but not limited to, an aircraft that embodies an analytical and/or interactive visualization regarding aircraft operation and/or performance capabilities of the aircraft associated with flight simulator 116. In a non-limiting embodiment, flight simulator 116 may generate a plurality of aircraft performance model outputs 120. The model outputs may include any simulation as described in the entirety of this disclosure. An "aircraft performance model output," for the purpose of this disclosure, is any simulation and/or model of the electric aircraft that embodies an analytical and/or interactive visualization regarding aircraft operation and/or performance capabilities. In a non-limiting embodiment, plurality of aircraft performance model output 120 may include a plurality of simulations of the electric aircraft using plurality of flight data 108 with each model providing, for each flight component in the set of flight components corresponding, force and moment data for each of a first set of operating conditions based on a first set of simulations performed by varying one or more flight component parameters while holding other flight components at a baseline value and a second set of simulations to determine interactions between the flight component and said other actuators under each of a second set of operating conditions. For example and without limitation, a first set may include a simulation representing one flight component and/or one set of flight components performing as a function of varied flight component parameters while the remaining flight components are configured to be at a cruise control in order to realize the strength, performance, and/or physical qualities of that first set. In a non-limiting embodiment, a second set may repeat a similar procedure as the first set but with a different flight component or a different set of flight components. In a non-limiting embodiment, computing device 112 may, but not limited to, consolidate, normalize, generalize, identify, and/or determine aerodynamic model output 128 as a function of the plurality of simulation data from the plurality of aircraft performance model outputs. In a non-limiting embodiment, aircraft performance model output 120 may include a simulation of the electric aircraft in the event of a failure, malfunction, or abnormality of at least one of its flight components in order to generate aerodynamic model output 128 in which the model represents a predicted simulation of what the electric aircraft may command its flight components as a function of computing device 112 that has the best chances of successful flight and/or operation with consideration of any past or potentially hazardous risks afforded by any flight component. Persons skilled in the art, upon reviewing the entirety of this disclosure, will be aware of the various embodiments of simulation and simulation data for the purposes of determining an optimal simulation and controls as described in the entirety of this disclosure.

With continued reference to FIG. 1, computing device 112 may be configured to generate aircraft performance model output 120 as a function of the failure response. A "failure response," for the purpose of this disclosure, is a controller allocation datum that includes a plurality of instructions and/or commands to resolve a failure event. A "failure event," for the purpose of this disclosure, is the event of a failure, abnormality, malfunction, or combination thereof, of an electrical component such as, but not limited to, any flight component of the electric aircraft. In a non-limiting embodiment, the failure event may include a malfunction of a rotor, forward pusher, propeller, battery, and the like thereof. For example and without limitation, the failure event may include an instance of a flight component being damaged or detached from the overall body of the electric aircraft during flight. In a non-limiting embodiment, the failure response may include a set of instructions of controller allocation datum 156 configured to compensate for instance of the failure event. The set of instructions in response to the failure event may include a representation of modified commands 152. For example and without limitation, the failure response may include instructions for remaining flight components to adjust its performance output to maintain stable and steady flight of the electric aircraft to compensate for a malfunctioning flight component. In a non-limiting embodiment, the failure response may include an output of alerts and/or sirens indicating an emergency situation. In a non-limiting embodiment, the failure response may include an automatic transmission of emergency to be received by other entities including an air traffic control. Persons skilled in the art, upon reviewing the entirety of this disclosure, will be aware of the various responses as a trigger of a failure event as disclosed in the entirety of this disclosure. An "aircraft performance model," as used in this disclosure, may include any model that can predict and/or simulate any behavior of an aircraft. In a non-limiting embodiment, aircraft performance model output 120 may include a model depicting the performance of the aircraft in which one or more of the flight components are malfunctioning or failing. In a non-limiting embodiment, aircraft performance model output 120 may be generated during a flight or after a flight has occurred. For example and without limitation, aircraft performance model output 120 may depict the performance of the aircraft and the aircraft flight components in real time as it is flying in the air. In a non-limiting embodiment, aircraft performance model output 120 may include a depiction of the flight of the aircraft. In a non-limiting embodiment, aircraft performance model output 120 may include a plurality of performance parameters include, but not limited to, aircraft velocity, attitude, actuator torque output, and the like thereof. In a non-limiting embodiment, aircraft performance model output 120 may highlight an abnormality of an actuator and a plurality of performance parameters associated with that abnormal actuator. Persons skilled in the art, upon reviewing the entirety of this disclosure, will be aware of the various embodiments of a simulation and/or model in the context of visualization and analysis consistent with this disclosure.

With continued reference to FIG. 1, plurality of aircraft performance model output 120 may include at least a battery performance model. A "battery performance model," for the purpose of this disclosure, is any model or simulation depicting quantifiable metrics of a battery source of an electric aircraft of any aircraft performance model output 120. The battery model may include any model related to at least property, characteristic, or function of a battery located within aircraft. In some cases, the battery model may include a model of a battery controller, management, and/or monitoring system. Disclosure related to battery management for eVTOL aircraft may be found in patent application Ser. Nos. 17/108,798 and 17/111,002, entitled "PACK LEVEL BATTERY MANAGEMENT SYSTEM" and "ELECTRICAL DISTRIBUTION MONITORING SYSTEM FOR AN ELECTRIC AIRCRAFT," respectively, each of which is incorporated herein by reference in its entirety. In some cases, a battery model may include an electrochemical model of battery, which may be predictive of energy efficiencies and heat generation and transfer of at least a battery. In some cases, a battery model may be configured to predict battery lifetime, given known battery parameters, for example measured battery performance, temperature, utilization, and the like. In a non-limiting embodiment, the battery performance model may include a thermal performance. A "thermal performance," for the purpose of this disclosure, is any temperature related output or data regarding a battery. In a non-limiting embodiment, the battery performance model may include a battery performance metric which may include, but is not limited to, battery charge, battery health, battery temperature, and/or battery usage. In some embodiments, the battery performance model to suggest a better flight maneuver and/or path to preserve the battery of the electric aircraft of an aircraft performance model output. For example and without limitation, the battery performance metric of an aircraft performance model output may include the battery health, battery consumption rate, battery temperature, and the like thereof, for a set of aircraft performance model outputs in which a set may include different battery performance metrics for different aircraft performance model outputs modeling varying positions and/or usages of the plurality of flight components of an electric aircraft. In a non-limiting embodiment, computing device 112 may identify aerodynamic model output 128 based on an aircraft performance model output that indicates the most efficient use of the battery based on a battery performance model. Persons skilled in the art, upon reviewing the entirety of this disclosure, will be aware of the various embodiments of simulation data regarding a battery for the purpose of analyzing efficient flight component configurations as described in the entirety of this disclosure.

With continued reference to FIG. 1, flight simulator 116 may be configured to generate expected aircraft performance model output 124. An "expected aircraft performance model output," for the purpose of this disclosure, is any aircraft performance model output of the aircraft that embodies an ideal or expected analytical and/or interactive visualization regarding aircraft operation and/or performance capabilities. In a non-limiting embodiment, expected aircraft performance model output 124 may include an aircraft performance model output that depicts a performance model in which none of the actuators are malfunctioning. For example and without limitation, expected aircraft performance model output 124 may be a model depicting a performance of what the aircraft should be based on the ideal, expected, or initial performance the aircraft actuators are intended to perform. For example and without limitation, expected aircraft performance model output 124 includes peak performance output including, but not limited to, power consumption, maximum torque output, cruising torque output, maximum attitude, cruising attitude, maximum velocity, cruising velocity, and the like thereof. For example and without limitation, expected aircraft performance model output 124 may highlight individual performance parameters of each actuator based on a sensor disposed on each actuator. In a non-limiting embodiment, expected aircraft performance model output 124 can be used to assess the performance of the aircraft actuators by comparing expected aircraft performance model output 124 to aircraft performance model output 124 and analyzing the difference between the data from the two models. In a non-limiting embodiment, computing device 112 may feed flight simulator 116 the ideal and/or peak performance parameters of an aircraft and its actuators to simulate expected aircraft performance model output 124 based on those ideal and/or peak performance parameters. In a non-limiting embodiment, expected aircraft performance model output 124 may include a plurality of expected aircraft performance model output 124 depicting a different failure modes of an aircraft and/or an aircraft's actuators. For example and without limitation, a rotor may fail by outputting max thrust, outputting zero thrust, or be stuck at an intermediate setting. In some embodiments, models are determined based on and/or for various actuator settings. In various embodiments, only highly likely or relatively dangerous actuator failure modes are considered and modeled. For example, a rotor may be modeled for a zero-output case but not for a pinned high case. Persons skilled in the art, upon reviewing the entirety of this disclosure, will be aware of the various models and comparisons consistent with this disclosure.

With continued reference to FIG. 1, computing device 112 is configured to identify a malfunctioning flight component of the electric aircraft as a function of plurality of measured flight data 108 and the plurality of aircraft performance model outputs 120. A "malfunctioning flight component," for the purpose of this disclosure, is a malfunctioning or failing actuator of an electric aircraft. In a non-limiting embodiment, the malfunctioning flight component may include any actuator that may produce abnormal outputs. For example and without limitation, the malfunctioning flight component may output a torque of 1.5 Newton-metre (Nm) while the remaining flight components may output a torque of 3.6 Nm. In a non-limiting embodiment, a flight component may include different failure modes which are represented by various expected aircraft performance model output 120. For example, a rotor may fail by outputting max thrust, outputting zero thrust, or be stuck at an intermediate setting. In some embodiments, models are determined based on and/or for various actuator settings. In various embodiments, only highly likely or relatively dangerous actuator failure modes are considered and modeled. For example, a rotor may be modeled for a zero-output case but not for a pinned high case.

In a non-limiting embodiment, computing device 112 may compare aircraft performance model output 124 with expected aircraft performance model output 124 to identify the malfunctioning flight component. For example and without limitation, computing device 112 may sort models based on their expected metrics and select the model that has expected metrics that closely match actual or observed metrics. In one example, the metrics compared include attitude and rates of change in attitude of the aircraft. In some embodiments, computing device 112 may compares observed metrics of the aircraft to expected metrics of the aircraft in an operable mode (e.g. no actuator failures associated with a "no failure" model). In a non-limiting embodiment, computing device 112 may receive from flight simulator 116, a plurality of expected aircraft performance model output 124 which may include a model for every possible failure mode. A "failure mode," for the purpose of this disclosure, is any state of the electric aircraft in which one or more actuators are defunct, malfunctioning, or failing. For example and without limitation, in an aircraft comprising four rotors, a model is determined for a first rotor failure, a second rotor failure, a third rotor failure, a fourth rotor failure, a first and second rotor failure, a first and third rotor failure, a first and fourth rotor failure, a second and third rotor failure, and a second and fourth rotor failure. Multiple additional models may be determined including a model for no rotor failure and all rotor failure in addition to a first, second, and third rotor failure and a second, third, and fourth rotor failure. In some embodiments, the number of models determined is equal to the number of actuators squared plus one. In some embodiments, the number of considered failure modes is less than the total possible failure modes. For example, models may not be determined for less likely failure modes in order to limit computations performed. Persons skilled in the art, upon reviewing the entirety of this disclosure, will be aware of various embodiments of failure modes used to identify a malfunctioning flight component consistent with this disclosure. In a non-limiting embodiment, the plurality of expected aircraft performance model output 124 may be sorted based on similarity to an observed flight datum. For example, an expected flight datum including expected attitude and expected attitude rate given a failure mode is determined or otherwise generated based on and/or for each model. In some embodiments, the models are sorted based on how closely their corresponding expected attitude and expected attitude rate matches the observed attitude and attitude rate. The sorted models may result in a sorted list of failure modes from most likely to least likely. For example, in the event a first rotor failure mode has a corresponding expected attitude that is 0.2 off from the observed attitude and an expected attitude rate that is 0.1 off from the observed attitude rate whereas a second rotor failure mode has a corresponding expected attitude that is 0.7 off from the observed attitude and an expected attitude rate that is 0.9 off from the observed attitude, the first rotor failure is determined to be more likely than the second rotor failure mode. In some embodiments, the summation of the difference between expected attitude and observed attitude and the difference between expected attitude rate and observed attitude rate is used to sort the models. In some embodiments, expected attitude is weighted more than expected attitude rate or vice versa. A model's similarity to observed metrics may be determined using various calculations based on the expected and observed values in various embodiments. In a non-limiting embodiment, computing device 112 may identify the malfunctioning flight component or one or more malfunctioning flight components 128 based on the sorted model. For example, the failure mode top of the sorted list may be selected.

Actuator failures that correspond to the failure mode are determined to be in effect. Persons skilled in the art, upon reviewing the entirety of this disclosure, will be aware of the various embodiments and uses for identifying a failure for purposes as described herein.

With continued reference to FIG. 1, computing device 112 may be configured to generate aerodynamic model output 128. An "aerodynamic model output," for the purpose of this disclosure, is an aircraft performance model output that embodies the optimal aircraft performance model output identified from the plurality of aircraft performance model outputs. In a non-limiting embodiment, aerodynamic model output 128 may be identified as a function of at least a malfunctioning flight component. In a non-limiting embodiment, aerodynamic model output 128 may include a predictive aircraft performance model output the predictive aircraft performance model output may be generated as a function of plurality of measured flight data 108 and any simulation data as described in the entirety of this disclosure. For example and without limitation, aerodynamic model output 128 may be a predictive model in which the electric aircraft may imitate to achieve an optimal flight.

With continued reference to FIG. 1 generate a machine-learning model, wherein the machine-learning model is configured to receive the plurality of measured flight data as an input and output an aerodynamic model output as a function of a training data. In a non-limiting embodiment, the machine-learning model may include a trained machine-learning model (e.g. a classifier) trained by the training data and configured to receive the plurality of measured flight data and output the aerodynamic model output. In a non-limiting embodiment, the training data may include any entries such as, but not limited to, any pilot input or pilot command correlated to an aircraft performance model output of the plurality of aircraft performance model outputs. In a non-limiting embodiment, the training data may be received from a database, wherein the database may be configured to store a plurality of the correlated model outputs. For example and without limitation, the database may be configured to store/record a plurality of past flight data and correlations which may be used to train the machine-learning model using a machine-learning algorithm. The machine-learning algorithm may include any machine-learning algorithm to train the machine-learning model using the training data.

With continued reference to FIG. 1, the training data may include a pilot input correlated to an element of flight movement data. An "element of flight movement data," for the purpose of this disclosure, is any element of data describing a maneuver of an electric aircraft or an electric aircraft controlled by a pilot. The element of flight movement data may include a plurality of maneuver data. The "plurality of maneuver data" as described in the entirety of this disclosure is data describing completion by the pilot of procedures and concepts that control the electric aircraft. For example and without limitation, the plurality of maneuver data may include foundational flight maneuvers, such as straight-and-level turns, climbs and descents, and/or performance maneuvers, such that the application of flight control pressures, attitudes, airspeeds, and orientations are constantly changing throughout the maneuver. For example and without limitation, the plurality of maneuver data may include, ground reference maneuvers, such as turns around a point, s-turns, rectangular ground maneuvering course, eights along a road, eights around pylons, hover taxi, air taxi, surface taxi, and the like. As a further example and without limitation, the plurality of maneuver data may include takeoffs and landings, such as normal takeoff and climb, crosswind takeoff and climb, short field takeoff and climb, normal takeoff from a hover, vertical takeoff to a hover, short field approach and landing, soft field approach and landing, touch and go, power-off 180 approach and landing, normal approach to a hover, crosswind approach to the surface, and the like. The plurality of maneuver data may further include, for example and without limitation, airborne maneuvers, such as trimming the aircraft, slow flight, lazy eights, chandelle, straight and level flight, turns, steep turns, unusual attitudes, spatial disorientation demonstration, hovering, hovering turn, rapid deceleration, reconnaissance procedures, and the like. The plurality of maneuver data, as a further non-limiting example, may include emergency preparedness, such as steep spirals, emergency approach and landing, spins, ditching, autorotation, vortex ring state, retreating blade stall, ground resonance, dynamic rollover, low rotor RPM, systems malfunction, flight diversions, and the like. Further, the plurality of maneuver data may include, as a non-limiting example, instrument procedures, such as aircraft holding procedures, arcing approach, instrument landing system approach, instrument reference climbs and descents, basic attitude instrument flight, and the like. Persons skilled in the art, upon reviewing the entirety of this disclosure, will be aware of various procedures and concepts that may represent the plurality of maneuver data consistently with this disclosure.

With continued reference to FIG. 1, in an embodiment, an element of flight movement data may be correlated with each maneuver data of the plurality of maneuver data where the element of flight movement data is located in the same data element and/or portion of data element as each maneuver data of the plurality of maneuver data; for example, and without limitation, an element of flight movement data may be correlated with each maneuver data of the plurality of maneuver s a further example, an element of flight movement data may be correlated with each maneuver data of the plurality data where both element of flight maneuver data and each maneuver data of the plurality of maneuver data are contained within the same first data element of the training set. A of maneuver data where both share a category label as described in further detail below, where each is within a certain distance of the other within an ordered collection of data in data element, or the like. Still further, an element of flight movement data may be correlated with each maneuver data of the plurality of maneuver data where the element of flight movement data and each maneuver data of the plurality of maneuver data share an origin, such as being data that was collected with regard to a single person or the like. In an embodiment, a first datum may be more closely correlated with a second datum in the same data element than with a third datum contained in the same data element; for instance, the first element and the second element may be closer to each other in an ordered set of data than either is to the third element, the first element and second element may be contained in the same subdivision and/or section of data while the third element is in a different subdivision and/or section of data, or the like. Persons skilled in the art, upon reviewing the entirety of this disclosure, will be aware of various forms and/or degrees of correlation between flight movement data and maneuver data that may exist in the training set and/or first data element consistently with this disclosure.

With continued reference to FIG. 1, computing device 112 may include outer loop controller 132, wherein outer loop controller 132 is configured to generate rate setpoint 136 as a function of plurality of measured flight data 108. An "outer loop controller," for the purpose of this disclosure, is a computing device configured to input one or more parameters, such as plurality of measured flight data and/or any aircraft performance model output 120 including aerodynamic model output 128 and output rate setpoint 136. For instance and without limitation, outer loop controller 132 may be consistent with outer loop controller in U.S. patent application Ser. No. 17/218,428 and titled "METHODS AND SYSTEMS FOR FLIGHT CONTROL CONFIGURED FOR USE IN AN ELECTRIC AIRCRAFT," which is incorporated herein by reference in its entirety. Outer loop controller 132 may include one or more computing devices consistent with this disclosure and/or one or more components and/or modules thereof. Outer loop controller 132 may be implemented using a microcontroller, a hardware circuit such as an FPGA, system on a chip, and/or application specific integrated circuit (ASIC). Outer loop controller 132 may be implemented using one or more analog elements such as operational amplifier circuits, including operational amplifier integrators and/or differentiators. Outer loop controller 132 may be implemented using any combination of the herein described elements or any other combination of elements suitable therefor. For instance and without limitation, rate setpoint 136 may be consistent with rate setpoint in U.S. patent application Ser. No. 17/218,428 and titled "METHODS AND SYSTEMS FOR FLIGHT CONTROL CONFIGURED FOR USE IN AN ELECTRIC AIRCRAFT," which is incorporated herein by reference in its entirety. Computing device 112 may use an outer angle loop driving an inner rate loop to provide closed loop control with setpoints of desired pitch attitude, roll attitude, and yaw rate provided directly by the pilot. The outer (angle) loop provides a rate setpoint. Rate setpoint 136 may include the desired rate of change of one or more angles describing the aircraft's orientation, heading, and propulsion, or a combination thereof. Rate setpoint 136 may include the pilot's desired rate of change of aircraft pitch angle, consistent with pitch angles, and largely at least an aircraft angle in the entirety of this disclosure. Rate setpoint 136 may include a measurement in a plurality of measurement systems including quaternions or any other measurement system as described herein.

With continued reference to FIG. 1, computing device 112 may include inner loop controller 140, wherein inner loop controller 140 may be configured to determine moment datum 144 as a function of rate setpoint 136. An "inner loop controller," for the purpose of this disclosure, is a computing device configured to determine a moment of an aircraft using the rate setpoint from the outer loop controller. A "moment datum," for the purpose of this disclosure, is any information describing the moment of an aircraft. Moment datum 144 includes information regarding pilot's desire to apply a certain moment or collection of moments on one or more portions of an electric aircraft, including the entirety of the aircraft. For instance and without limitation, inner loop controller may be consistent with inner loop controller in U.S. patent application Ser. No. 17/218,428 and titled "METHODS AND SYSTEMS FOR FLIGHT CONTROL CONFIGURED FOR USE IN AN ELECTRIC AIRCRAFT," which is incorporated herein by reference in its entirety. Inner loop controller 140 may be implemented in any manner suitable for implementation of outer loop controller. The inner loop of the controller may be composed of a lead-lag filter for roll rate, pitch rate, and yaw rate, and an integrator that acts only on yaw rate. Integrators may be avoided on the roll and pitch rate because they introduce additional phase lag that, coupled with the phase lag inherent to slow lift fans or another type of one or more propulsors, limits performance. Furthermore, it may not be necessary to have good steady state error in roll and pitch rate, which an integrator helps achieve in yaw rate. A final component of the inner loop may include gain scheduling on lift lever input. As previously discussed, the only controller change between low speed flight and fully wing-borne flight may be this gain scheduling. The plot below shows the input to output gain of this function for varying lift lever inputs. At anything above the assisted lift input corresponding to zero airspeed flight, the full requested moment from the inner loop may be sent to the mixer. At assisted lift levels lower than this, the requested moment from the inner loop may be multiplied by a gain that linearly decays to zero as shown in the plot below. The exact shape of this gain reduction may be open to change slightly. Experimentation in simulation has shown that anything between a square root function up to the IGE average torque setting and the linear map shown above works acceptably. Because the moment that can be generated by the control surfaces in pitch may be such a strong function of angle of attack, the relatively small difference in hover moment achieved between the linear and square root maps may be washed out by the angle of attack variation in a transition. At low lift lever input, the plane would have to have significant unpowered lift (and therefore airspeed) to not lose altitude. In this case, the control surface effectivity will be significant, and full moment production from the lift motors will not be necessary. When the lift lever may be all the way down, the lift motors may stop rotation and stow into a low drag orientation. Then, the only control authority comes from the aerodynamic control surfaces, and the plane controlled exclusively via manual pilot inputs. On transition out from vertical to cruise flight, the coordination and scheduling of control may be intuitive and straightforward. In a non-limiting example, during the transition in, or decelerating from an aborted takeoff, it may be important that the pilot not decrease assisted lift below a 15% average torque threshold in order to maintain aircraft control and not develop an unrecoverable sink rate when operating in certain airspeed regimes such as the transition regime. A mechanical detent may be installed in the lift lever, throttle, or any control input, to provide proprioceptive feedback when crossing this threshold which should occur operationally only during the terminal phases of a vertical landing. In a non-limiting embodiment, inner loop controller 140 may include a lead-lag-filter. Inner loop controller 140 may include an integrator. The attitude controller gains are scheduled such that full gain authority may be only achieved when the assisted lift lever may be greater than 50% torque, which corresponds to a nominal torque required to support the aircraft without fully developed lift from the wing. At average torque levels lower than said nominal levitation torque, the output of the inner loop (desired moment vector to apply to the vehicle) may be directly scaled down. This decrease in moment generated at the lift rotors may be designed to be directly complementary to the increase in aerodynamic control surface effectivity as the dynamic pressure builds on the flying wing and the flying surfaces. As a result, the total moment applied to the vehicle for a given pilot input may be kept near constant.

With continued reference to FIG. 1, moment datum 144 may include a plurality of prioritization data, wherein the prioritization comprising a prioritization datum corresponding to each of the plurality of aircraft performance model outputs. In a non-limiting embodiment, mixer 148 may be configured to receive a plurality of prioritization data including a prioritization datum corresponding to each of the plurality of attitude commands. For instance and without limitation, the plurality of prioritization data may be consistent with plurality of prioritization data in U.S. Pat. No. 11,142,333, filed on Mar. 10, 2021, and titled SYSTEM AND METHOD FOR FLIGHT CONTROL IN ELECTRIC AIRCRAFT, which is incorporated herein by reference in its entirety. The plurality of prioritization data may include one or more elements of data representing relative weight, importance, preservation, or otherwise ranking of attitudes of an aircraft. The Prioritization datum may be one of the plurality of prioritization data, such as the relative importance of each attitude command. For example, and without limitation, prioritization datum may include a coefficient associated with the pitch attitude command, this coefficient would determine a rank of preservation of pitch attitude command relative to roll, yaw, and lift. That is to say that if a pilot commands aircraft to change pitch and yaw, and the command would violate a vehicle torque limit, the mixer would determine the relatively higher importance of pitch, and preserve the pitch command, while compromising the yaw command, according to available power to the propulsor.

With continued reference to FIG. 1, computing device 112 may comprise mixer 148, wherein mixer 148 may be configured to generate allocation command datum 156 as a function of moment datum 144 and plurality of aircraft performance model outputs 120. A "mixer," for the purpose of this disclosure, is a computing device configured identify how much moment was generated by aerodynamic forces acting on one or more flight components and may feed this back to the inner loop controller and the outer loop controller to prevent integral windup. An "allocation command datum," for the purpose of this disclosure, is command for a torque allocation to be applied to one or more actuators of the electric aircraft. In a non-limiting embodiment, allocation command datum 156 may include unique torque allocations for each actuator. For example and without limitation, allocation command datum 156 may instruct each functioning actuator to allocate a torque output of 4 Nm and instruct defunct actuator 128 to allocate a torque output of 0.4 Nm. For example and without limitation, allocation command datum 156 may instruct one or more defunct actuators 128 to command a torque of 0 Nm and the remaining functioning actuators a torque of 6 Nm. In a non-limiting embodiment, allocation command datum 156 may be generated as a function of a torque allocation. For instance and without limitation, torque allocation may be consistent with the description of torque allocation in U.S. Pat. No. 11,142,333, filed on Mar. 10, 2021, and titled, "SYSTEM AND METHOD FOR FLIGHT CONTROL IN ELECTRIC AIRCRAFT", which is incorporated herein in its entirety by reference. In a non-limiting embodiment, computing device 112 may generate allocation command datum 156 as a function of a machine-learning model. In a non-limiting embodiment, the machine-learning model may include inputs such as a moment datum, a vehicle torque limit, any prioritization data, and a plurality of measured flight data and output allocation command datum 156 and/or at least modified commands 152.

In a non-limiting embodiment, moment datum 144 may include a plurality of attitude commands and allocates one or more outgoing signals, such as modified attitude commands and output torque command, or the like, to at least a propulsor, flight component, or one or more computing devices connected thereto. For instance and without limitation, mixer may be consistent with mixer in U.S. patent application Ser. No. 17/218,428 and titled "METHODS AND SYSTEMS FOR FLIGHT CONTROL CONFIGURED FOR USE IN AN ELECTRIC AIRCRAFT," which is incorporated herein by reference in its entirety. Additionally and alternatively, mixer 148, as used herein, may be described as performing "control allocation" or "torque allocation." A "torque allocation," for the purpose of this disclosure, is an action of varying torque of an aircraft's flight components with optimization considerations. For example, mixer may take in commands to alter aircraft trajectory that requires a change in pitch and yaw. Mixer may allocate torque to at least one propulsor (or more) that do not independently alter pitch and yaw in combination to accomplish the command to change pitch and yaw. More than one propulsor may be required to adjust torques to accomplish the command to change pitch and yaw, mixer would take in the command and allocate those torques to the appropriate propulsors consistent with the entirety of this disclosure. One of ordinary skill in the art, after reading the entirety of this disclosure, will appreciate the limitless combination of propulsors, flight components, control surfaces, or combinations thereof that could be used in tandem to generate some amount of authority in pitch, roll, yaw, and lift of an electric aircraft consistent with this disclosure.

With continued reference to FIG. 1, mixer 148 may be configured to determine a plurality of modified commands 152 as a function of the at least a vehicle torque limit, plurality of attitude commands and the plurality of prioritization data. In a non-limiting embodiment, mixer 148 may allocate torque to plurality of propulsors such that any pilot inputs are adjusted as a function of the prioritization data and the vehicle torque limits. Modified commands 152 may be prioritized to preserve more important attitude commands, for instance as represented by the prioritization data, when the vehicle torque limits precludes all pilot inputs from being executed exactly as inputted. Modified commands 152 may include one or more attitude commands within the vehicle torque limits. Mixer 148 may generate modified command 152 for at least a propulsor as a function of solving the at least an optimization problem. Mixer 148 may transmit modified command 152 to at least a propulsor. Modified command 152 may be used iteratively as a torque limit in a control loop such that system 100 can adjust at a certain rate to outside conditions such as environmental conditions, namely airspeed, altitude, attitude, air density, and the like.

With continued reference to FIG. 1, mixer 148 may configured to receive at least the vehicle torque limit. The vehicle torque limit may include one or more elements of data representing maxima, minima, or other limits on vehicle torques, forces, attitudes, rates of change, or a combination thereof. The vehicle torque limit may include individual limits on one or more propulsors, one or more flight components, structural stress or strain, energy consumption limits, or a combination thereof. The vehicle torque limit may include attitudes in which aircraft cannot enter such as maximum or minimum pitch angle or pitch angle rate of change, the vehicle torque limit in a non-limiting example, may include a limit on one or more propulsors calculated in order to keep aircraft within a pitch angle range. The vehicle torque limit may be a relative limit, as in a non-limiting example, may include maximum lift from one or more propulsors based on environmental factors such as air density. The vehicle torque limits may include graphical limits, such as points or lines on a graphical representation of certain attitudes, such as pitch vs. lift, or pitch vs. roll, for example. The vehicle torque limits may be displayed to a pilot, user, or be embedded in the controls such that a pilot is unable to maneuver an aircraft that would violate the vehicle torque limit as described herein.

With continued reference to FIG. 1, mixer 148 may be configured to solve at least an optimization problem, which may be an objective function. An "objective function," as used in this disclosure, is a mathematical function with a solution set including a plurality of data elements to be compared. Mixer 148 may compute a score, metric, ranking, or the like, associated with each performance prognoses and candidate transfer apparatus and select objectives to minimize and/or maximize the score/rank, depending on whether an optimal result may be represented, respectively, by a minimal and/or maximal score; an objective function may be used by mixer to score each possible pairing. At least an optimization problem may be based on one or more objectives, as described below. Mixer 148 may pair a candidate transfer apparatus, with a given combination of performance prognoses, that optimizes the objective function. In various embodiments solving at least an optimization problem may be based on a combination of one or more factors. Each factor may be assigned a score based on predetermined variables. In some embodiments, the assigned scores may be weighted or unweighted. Solving at least an optimization problem may include performing a greedy algorithm process, where optimization may be performed by minimizing and/or maximizing an output of objective function. A "greedy algorithm" is defined as an algorithm that selects locally optimal choices, which may or may not generate a globally optimal solution. For instance, mixer may select objectives so that scores associated therewith are the best score for each goal. For instance, in non-limiting illustrative example, optimization may determine the pitch moment associated with an output of at least a propulsor based on an input.

Still referring to FIG. 1, at least an optimization problem may be formulated as a linear objective function, which mixer may optimize using a linear program such as without limitation a mixed-integer program. A "linear program," as used in this disclosure, is a program that optimizes a linear objective function, given at least a constraint; a linear program maybe referred to without limitation as a "linear optimization" process and/or algorithm. For instance, in non-limiting illustrative examples, a given constraint might be torque limit, and a linear program may use a linear objective function to calculate maximum output based on the limit. In various embodiments, mixer may determine a set of instructions towards achieving a user's goal that maximizes a total score subject to a constraint that there are other competing objectives. A mathematical solver may be implemented to solve for the set of instructions that maximizes scores; mathematical solver may be implemented on mixer and/or another device in flight control system 100, and/or may be implemented on third-party solver. At least an optimization problem may be formulated as nonlinear least squares optimization process. A "nonlinear least squares optimization process," for the purposes of this disclosure, is a form of least squares analysis used to fit a set of m observations with a model that is non-linear in n unknown parameters, where m is greater than or equal to n. The basis of the method is to approximate the model by a linear one and to refine the parameters by successive iterations. A nonlinear least squares optimization process may output a fit of signals to at least a propulsor. Solving at least an optimization problem may include minimizing a loss function, where a "loss function" is an expression an output of which a ranking process minimizes to generate an optimal result. As a non-limiting example, mixer may assign variables relating to a set of parameters, which may correspond to score components as described above, calculate an output of mathematical expression using the variables, and select an objective that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

With continued reference to FIG. 1, mixer 148 may be configured to generate allocation command datum 156 as a function of the torque allocation. Allocation command datum 156 may include at least a torque vector. Allocation command datum 156 may be represented in any suitable form, which may include, without limitation, vectors, matrices, coefficients, scores, ranks, or other numerical comparators, and the like. A "vector" as defined in this disclosure is a data structure that represents one or more quantitative values and/or measures of forces, torques, signals, commands, or any other data structure as described in the entirety of this disclosure. A vector may be represented as an n-tuple of values, where n is at least two values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and may be distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where a is attribute number i of the vector. Scaling and/or normalization may function to make vector comparison independent of absolute quantities of attributes, while preserving any dependency on similarity of attributes. One of ordinary skill in the art would appreciate a vector to be a mathematical value consisting of a direction and magnitude. A "torque", for the purposes of this disclosure, refers to a twisting force that tends to cause rotation. Torque is the rotational equivalent of linear force. In three dimensions, the torque may be a pseudovector; for point particles, it may be given by the cross product of the position vector (distance vector) and the force vector. The magnitude of torque of a rigid body depends on three quantities: the force applied, the lever arm vector connecting the point about which the torque may be being measured to the point of force application, and the angle between the force and lever arm vectors. A force applied perpendicularly to a lever multiplied by its distance from the lever's fulcrum (the length of the lever arm) may be its torque. A force of three newtons applied two meters from the fulcrum, for example, exerts the same torque as a force of one newton applied six meters from the fulcrum. The direction of the torque can be determined by using the right-hand grip rule: if the fingers of the right hand are curled from the direction of the lever arm to the direction of the force, then the thumb points in the direction of the torque. One of ordinary skill in the art would appreciate that torque may be represented as a vector, consistent with this disclosure, and therefore includes a magnitude of force and a direction. "Torque" and "moment" are equivalents for the purposes of this disclosure. Any torque command or signal herein may include at least the steady state torque to achieve the initial vehicle torque signal output to at least a propulsor.

With continued reference to FIG. 1, as previously disclosed, solving at least an optimization problem may include solving sequential problems relating to vehicle-level inputs to at least a propulsor, namely pitch, roll, yaw, and collective force. Mixer 148 may solve at least an optimization problem in a specific order. According to exemplary embodiments, mixer 148 may solve at least an optimization problem wherein at least an optimization problem includes a pitch moment function. Solving may be performed using a nonlinear program and/or a linear program. Mixer may solve at least an optimization problem wherein solving at least an optimization program may include solving a roll moment function utilizing a nonlinear program to yield the desired amount of roll moment as a function of the desired amount of pitch moment. Mixer 148 may solve at least an optimization problem wherein solving at least an optimization program may include solving a collective force function utilizing a nonlinear program to yield the desired amount of collective force as a function of the desired amount of pitch moment and the desired amount of roll moment. Mixer 148 may solve at least an optimization problem wherein solving at least an optimization program may include solving a yaw moment function utilizing a nonlinear program to yield the desired amount of yaw moment, as a function of the desired amount of pitch moment, the desired amount of roll moment, and the desired amount of collective force. One of ordinary skill in the art, after reading the entirety of this disclosure, will appreciate that any force program may be implemented as a linear or non-linear program, as any linear program may be expressed as a nonlinear program.

With continued reference to FIG. 1, mixer 148 may include one or more computing devices as described herein. Mixer 148 may be a separate component or grouping of components from those described herein. Mixer 148 is configured to generate allocation command datum 156 as a function of the torque allocation. Mixer 148 may be configured to allocate a portion of total possible torque amongst one or more propulsors based on relative priority of a plurality attitude control commands and desired aircraft maneuver. In a non-limiting illustrative example, torque allocation between two attitude control components (e.g., pitch and roll or roll and yaw) may be based on the relative priorities of those two attitude control components. Priority refers to how important to the safety of the aircraft and any users while performing the attitude control component may be relative to the other attitude control commands. Priority may also refer to the relative importance of each attitude control component to accomplish one or more desired aircraft maneuvers. For example, pitch attitude control component may be the highest priority, followed by roll, lift, and yaw attitude control components. In another example, the relative priority of the attitude components may be specific to an environment, aircraft maneuver, mission type, aircraft configuration, or other factors, to name a few. Torque allocator may set the highest priority attitude control component torque allocation as close as possible given the torque limits as described in this disclosure to the original command for the higher-priority attitude control component, in the illustrative example, pitch, then project to the value possible for the lower priority attitude control component, in this case, lift. The higher priority attitude control component in the first torque allocation may be the attitude control component with the highest overall priority. This process may be then repeated with lower priority attitude control component from the above comparison and the next highest down the priority list. In a non-limiting illustrative example, the next two-dimensional torque allocation problem solved would include lift and roll attitude control commands. In embodiments, the lower priority attitude command component has already been set form the previous two-dimensional torque allocation, so this may be projecting the closest possible value for the third-level attitude command (roll in this example). This process would repeat again for the third and fourth attitude components, in this non-limiting example, roll and yaw attitude control components. Since roll may be prioritized over yaw, the roll attitude control command would be preserved, and yaw would be sacrificed as a function of the vehicle torque limits as described herein. After the sequence of two-dimensional attitude control component torque allocation are completed and four prioritized attitude component commands are set, one or more components may send out commands to flight control surfaces/ propulsors to generate the set torque values allocated in the foregoing process. As a non-limiting example of one step in the torque allocation process, pitch axis may represent the command or plurality of attitude commands inputted to mixer 148 as described herein, such as moment datum 140. Pitch axis may be conditioned or altered to be inputted to mixer 148. For example, and without limitation, initial vehicle torque signal may include pitch and lift commands within plurality of attitude commands. Mixer 148 may also receive at least a moment datum 140, which may be represented without limitation by a box plotted within the pitch and lift axes. A point where pitch command and lift command intersect may represent initial vehicle torque signal as projected onto exemplary graph of pitch and lift axes, which may be the same or similar to initial vehicle torque signal as disclosed in the entirety of this disclosure. Mixer 148 utilizes prioritization data as described in the entirety of this disclosure to solve this two-dimensional problem by preserving the higher priority command and sacrificing the lower priority command. This prioritization preservation process may be illustrated, as a non-limiting example by placement of a modified attitude command, wherein the pitch command was preserved (horizontally translated and therefore unchanged from the initial command), while the lift command was lessened to bring the modified attitude command within vehicle torque limits (the box). The modified attitude command, as discussed in the entirety of this disclosure, may be further combined, modified, conditioned, or otherwise adjusted to produce output torque command to the plurality of propulsors. The remaining vehicle torque represents the remaining torque capability in one or more propulsors before, during, and after an aircraft maneuver. The remaining vehicle torque may include an individual propulsor's remaining torque capability, one or more of pitch, roll, yaw, and lift, capabilities of one or more propulsors, the remaining vehicle-level torque or power for subsequent maneuvers. The remaining vehicle torque may be displayed to a pilot or user. The above-described may be a non-limiting example of one step in the torque allocation process. Torque allocation process may be similar, or the same process as described above with the torque limits adjusted for inertia compensation. Mixer 148 may be disposed fully or partially within mixer any mixer as disclosed herein. Mixer 148 may include one or more computing devices as described herein. Mixer 148 also receives at least a vehicle torque limit represented by an imaginary box plotted within the pitch and lift axes, which may be the same as, or similar to at least a vehicle torque limit. Here instead of the box being made of straight linear sides, the inertia compensation as previously discussed creates curved limits, wherein certain plurality of attitude commands may be allowed whereas without inertia compensation they would be outside of the limits. Where the pitch command and lift command intersect may be the initial vehicle torque signal, which may be the same or similar to initial vehicle torque signal as disclosed in the entirety of this disclosure. Mixer 148 utilizes prioritization data as described in the entirety of this disclosure to solve this two-dimensional problem by preserving the higher priority command and sacrificing the lower priority command. This prioritization preservation process may be shown by the placement of modified attitude command, wherein the pitch command was preserved (horizontally translated and therefore unchanged from the initial command), while the lift command was lessened to bring the modified attitude command within vehicle torque limits (the box). Allocation command datum 156 effectively commands the amount of torque to one or more propulsors to accomplish the closest vehicle level torque to initial vehicle torque signal as possible given certain limits, maneuvers, and aircraft conditions. Modified attitude command, as discussed in the entirety of this disclosure, may be further combined, modified, conditioned, or otherwise adjusted to produce output torque command to the plurality of propulsors. The remaining vehicle torque represents the remaining torque capability in one or more propulsors before, during, and after an aircraft maneuver. The remaining vehicle torque may include an individual propulsor's remaining torque capability, one or more of pitch, roll, yaw, and lift, capabilities of one or more propulsors, the remaining vehicle-level torque or power for subsequent maneuvers.

With continued reference to FIG. 1, computing device 112 may be configured to perform a torque allocation on flight component 160 of a plurality of flight components as a function of allocation command datum 156. In a non-limiting embodiment, the torque allocation may be performed as a function of moment datum 144 and/or at least modified commands 152. In a non-limiting embodiment, allocation command datum 156 may instruct flight component 160 of a plurality of flight components to follow the model of aerodynamic model output 128 which is based on a plurality of simulation data. In a non-limiting embodiment, computing device 112 may be configured to display allocation command datum 156 to display 164. Display 164 is configured to present, to a user, the remaining vehicle torque. Display 164 may include a graphical user interface, multi-function display (MFD), primary display, gauges, graphs, audio cues, visual cues, information on a heads-up display (HUD) or a combination thereof. Display 164 may include a display disposed in one or more areas of an aircraft, on a user device remotely located, one or more computing devices, or a combination thereof. Display 164 may be disposed in a projection, hologram, or screen within a user's helmet, eyeglasses, contact lens, or a combination thereof. System 100 may include display 164 that displays remaining vehicle torque to a user in graphical form. Graphical form may include a two-dimensional plot of two variables in that represent real-world data, such as pitch torque vs. roll torque of an aircraft. System 100 may include display 164 wherein the remaining vehicle torque is presented to a user in a graphical representation of an electric aircraft. In a non-limiting example, a graphical representation of an electric aircraft may show arrows, levels, bar graphs, percentages, or another representation of remaining vehicle torques in a plurality of planes of motion such as pitch moment, roll moment, yaw moment, and lift force, individually or collectively. Remaining vehicle torque may include remaining vehicle torque capability in an aircraft's pitch moment. Remaining vehicle torque may include the remaining vehicle torque capability in an aircraft's roll moment.

Figure 2:
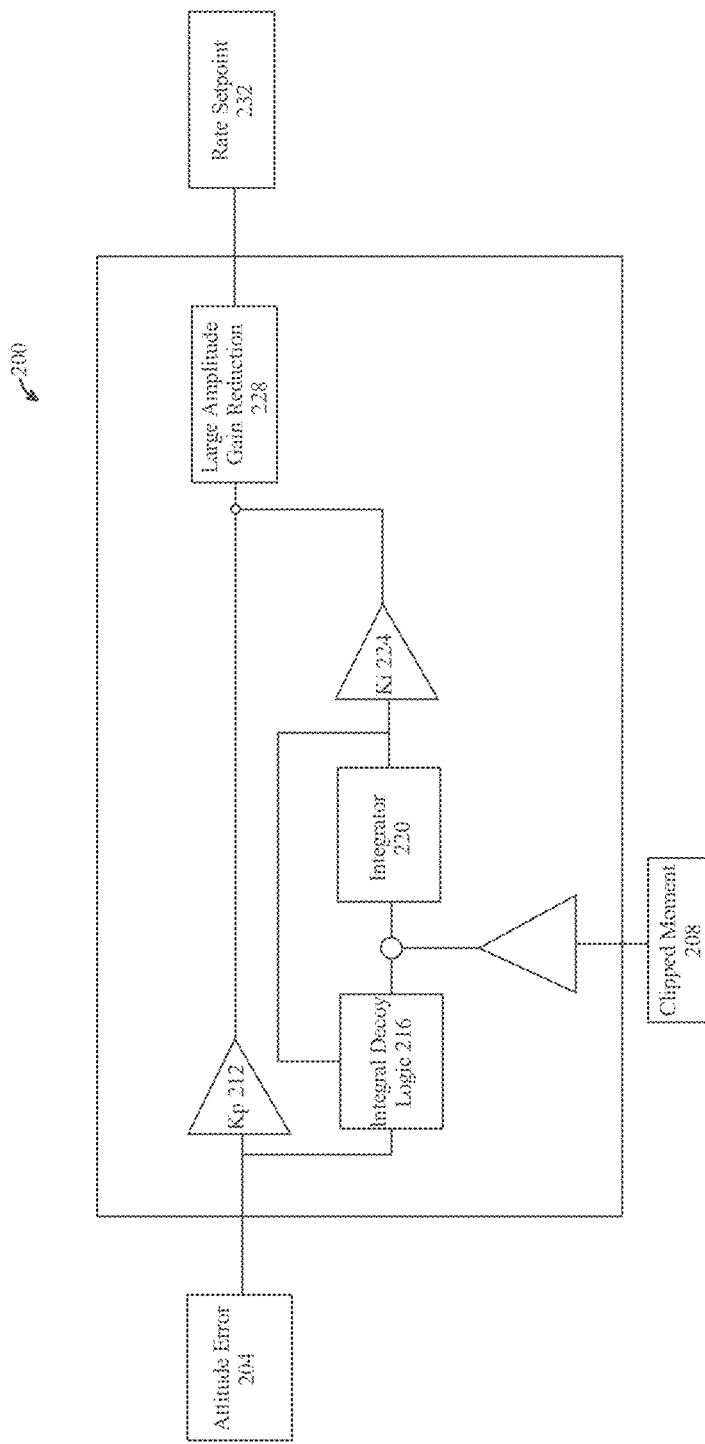
FIG. 2 is an illustrative embodiment of an outer loop controller for use in embodiments of the present invention.

Referring now to FIG. 2, an exemplary embodiment of outer loop controller 200 is presented in block diagram form. Outer loop controller 200 may be consistent with any outer loop controller as described herein. Outer loop controller 200 may include attitude error 204. Attitude error 204 may include a measurement of the difference between the commanded at least an aircraft angle and the actual angle of the aircraft in any of pitch, roll, yaw, or a combination thereof. The attitude error 204 may include a percentage, measurement in degrees, measurement in radians, or one or more representations of a difference in commanded aircraft angle as a function of input datum 104 and actual angle of aircraft in the aforementioned attitudes. Attitude error 204 may include measurements as detected by one or more sensors configured to measure aircraft angle like an IMU, gyroscope, motion sensor, optical sensor, a combination thereof, or another sensor of combination of sensors. In a non-limiting embodiment, outer loop controller 200 may include clipped moment 208 as an input to controller. Clipped moment 208 may include one or more elements of data that have been selected from a larger sample size or range. Clipped moment 208 may have been selected for its lack of noise, improved efficiency, or accuracy of moment associated with any one or more elements of an electric aircraft consistent with the entirety of this disclosure. Gain may be a linear operation. Gain compression may be not linear and, as such, its effect may be one of distortion, due to the nonlinearity of the transfer characteristic which also causes a loss of 'slope' or 'differential' gain. So, the output may be less than expected using the small signal gain of the amplifier. In clipping, the signal may be abruptly limited to a certain amplitude and may be thereby distorted in keeping under that level. This creates extra harmonics that are not present in the original signal. "Soft" clipping or limiting means there isn't a sharp "knee point" in the transfer characteristic. A sine wave that has been softly clipped will become more like a square wave with more rounded edges, but will still have many extra harmonics. In a non-limiting embodiment, outer loop controller 200 may include Kp operational amplifier 212. Kp op amp 212 may include one or more constants configured to scale any one or more signals in any control loop or otherwise computing devices for use in controlling aspects of an electric aircraft. Outer loop controller 200 may include integral decoy logic 216. Outer loop controller 200 may include integrator 220. In a non-limiting embodiment, integrator 220 may include an operational amplifier configured to perform a mathematical operation of integration of a signal; output voltage may be proportional to input voltage integrated over time. An input current may be offset by a negative feedback current flowing in the capacitor, which may be generated by an increase in output voltage of the amplifier. The output voltage may be therefore dependent on the value of input current it has to offset and the inverse of the value of the feedback capacitor. The greater the capacitor value, the less output voltage has to be generated to produce a particular feedback current flow. The input impedance of the circuit may be almost zero because of the Miller effect. Hence all the stray capacitances (the cable capacitance, the amplifier input capacitance, etc.) are virtually grounded and they have no influence on the output signal. Operational amplifier as used in integrator may be used as part of a positive or negative feedback amplifier or as an adder or subtractor type circuit using just pure resistances in both the input and the feedback loop. As its name implies, the Op-amp Integrator is an operational amplifier circuit that causes the output to respond to changes in the input voltage over time as the op-amp produces an output voltage which may be proportional to the integral of the input voltage. In other words, the magnitude of the output signal may be determined by the length of time a voltage may be present at its input as the current through the feedback loop charges or discharges the capacitor as the required negative feedback occurs through the capacitor. Input voltage (Vin) may represent the input signal to controller such as one or more of sensor datum 108 and/or attitude error 204. Output voltage (Vout) may represent output voltage such as one or more outputs like rate setpoint 232. When a step voltage, Vin may be firstly applied to the input of an integrating amplifier, the uncharged capacitor (C) has very little resistance and acts a bit like a short circuit allowing maximum current to flow via the input resistor, Rin as potential difference exists between the two plates. As the impedance of the capacitor at this point may be very low, the gain ratio of $X_C/R_{IN}$ may be also very small giving an overall voltage gain of less than one, (voltage follower circuit). As the feedback capacitor, C begins to charge up due to the influence of the input voltage, its impedance Xc slowly increase in proportion to its rate of charge. The capacitor charges up at a rate determined by the resistor-capacitor (RC) time constant, of the series RC network. Negative feedback forces the op-amp to produce an output voltage that maintains a virtual earth at the op-amp's inverting input. Since the capacitor may be connected between the op-amp's inverting input (which may be at virtual ground potential) and the op-amp's output (which may be now negative), the potential voltage developed across the capacitor slowly increases causing the charging current to decrease as the impedance of the capacitor increases. This results in the ratio of Xc/Rin increasing producing a linearly increasing ramp output voltage that continues to increase until the capacitor may be fully charged. At this point the capacitor acts as an open circuit, blocking any more flow of DC current. The ratio of feedback capacitor to input resistor ($X_C/R_{IN}$) may be now infinite resulting in infinite gain. The result of this high gain (similar to the op-amps open-loop gain) may be that the output of the amplifier goes into saturation as shown below. (Saturation occurs when the output voltage of the amplifier swings heavily to one voltage supply rail or the other with little or no control in between). The rate at which the output voltage increases (the rate of change) may be determined by the value of the resistor and the capacitor, "RC time constant." By changing this RC time constant value, either by changing the value of the Capacitor (C) or the Resistor (R), the time in which it takes the output voltage to reach saturation can also be changed for example. In a non-limiting embodiment, outer loop controller 200 may include a double integrator, consistent with the description of an integrator with the entirety of this disclosure. Single or double integrators consistent with the entirety of this disclosure may include analog or digital circuit components. In a non-limiting embodiment, outer loop controller 200 may include Ki operational amplifier 224. Ki op amp 224 may be a unique constant configured to scale any one or more signals or data as described herein with reference to kp op amp 212. Outer loop controller 200 may include large amplitude gain reduction 228. In a non-limiting embodiment, large amplitude gain reduction 228 may be configured to reduce gain on large amplitude input signals consistent with the above description. For example and without limitation, compression of gain may be caused by non-linear characteristics of the device when run at large amplitudes. With any signal, as the input level may be increased beyond the linear range of the amplifier, gain compression will occur. For example and without limitation, a transistor's operating point may move with temperature, so higher power output may lead to compression due to collector dissipation. But it may be not a change in gain; it may be non-linear distortion. The output level stays relatively the same as the input level goes higher. Once the non-linear portion of the transfer characteristic of any amplifier may be reached, any increase in input will not be matched by a proportional increase in output. Thus, there may be compression of gain. Also, at this time because the transfer function may be no longer linear, harmonic distortion will result. In intentional compression (sometimes called automatic gain control or audio level compression as used in devices called 'dynamic range compressors', the overall gain of the circuit may be actively changed in response to the level of the input over time, so the transfer function remains linear over a short period of time. A sine wave into such a system will still look like a sine wave at the output, but the overall gain may be varied, depending on the level of that sine wave. Above a certain input level, the output sine wave will always be the same amplitude. The output level of Intentional compression varies over time, in order to minimize non-linear behavior. With gain compression, the opposite may be true, its output may be constant. In this respect intentional compression serves less of an artistic purpose.

Figure 3:
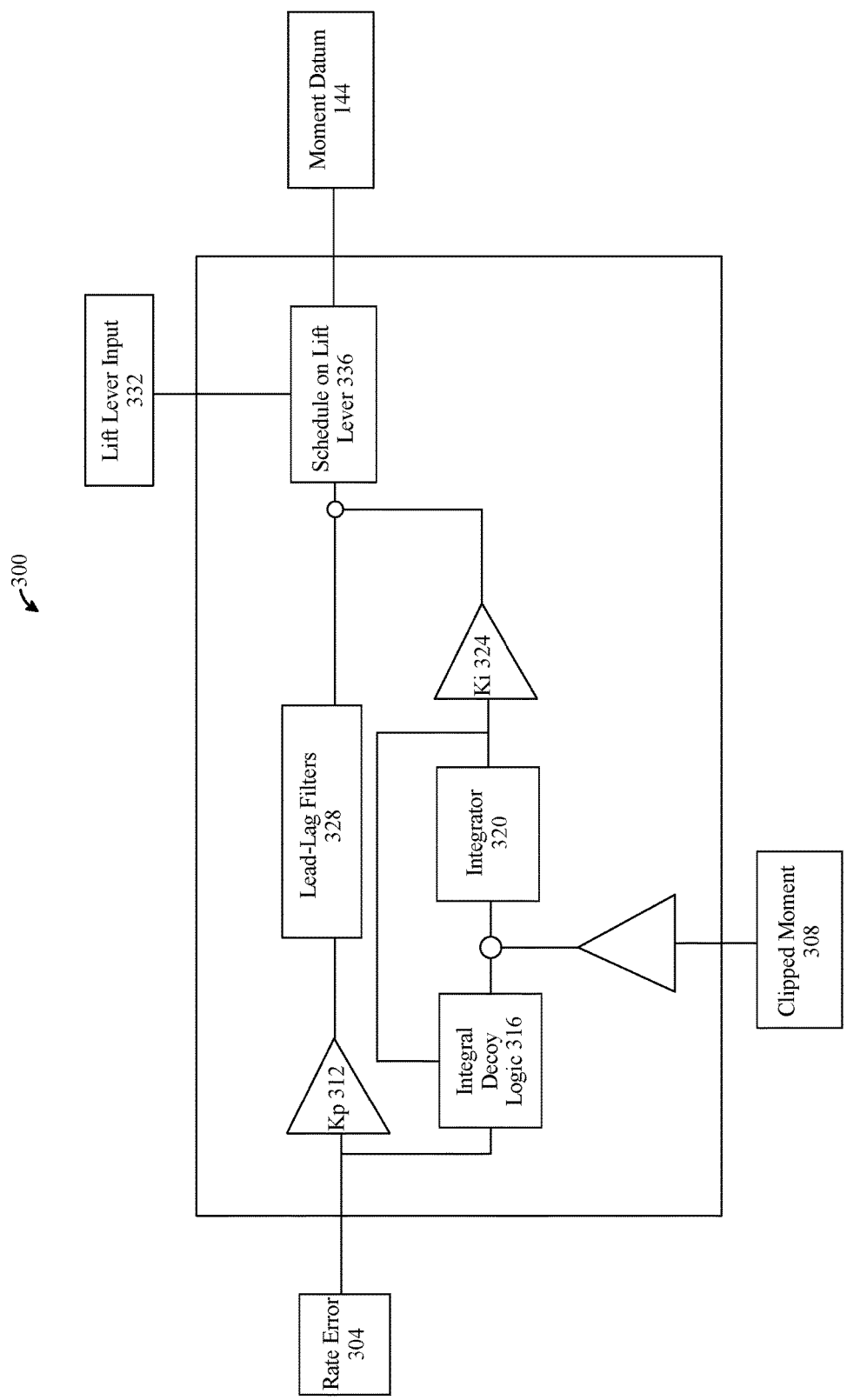
FIG. 3 is an illustrative embodiment of an inner loop controller for use in embodiments of the present invention.

Referring now to FIG. 3, an exemplary embodiment of inner loop controller 300 is presented in block diagram form. Inner loop controller 300 may include clipped moment 308 as an input to controller. Gain may be a linear operation. Gain compression may be not linear and, as such, its effect may be one of distortion, due to the nonlinearity of the transfer characteristic which also causes a loss of 'slope' or 'differential' gain. So, the output may be less than expected using the small signal gain of the amplifier. In clipping, the signal may be abruptly limited to a certain amplitude and may be thereby distorted in keeping under that level. This creates extra harmonics that are not present in the original signal. "Soft" clipping or limiting means there isn't a sharp "knee point" in the transfer characteristic. A sine wave that has been softly clipped will become more like a square wave with more rounded edges but will still have many extra harmonics. Inner loop controller 300 may include Kp operational amplifier 312. Inner loop controller 300 may include integral decoy logic 316. Inner loop controller 300 may include integrator 320. Integrator 320 may include an operational amplifier configured to perform a mathematical operation of integration of a signal; output voltage may be proportional to input voltage integrated over time. An input current may be offset by a negative feedback current flowing in the capacitor, which may be generated by an increase in output voltage of the amplifier. The output voltage may be therefore dependent on the value of input current it has to offset and the inverse of the value of the feedback capacitor. The greater the capacitor value, the less output voltage has to be generated to produce a particular feedback current flow. The input impedance of the circuit almost zero because of the Miller effect. Hence all the stray capacitances (the cable capacitance, the amplifier input capacitance, etc.) are virtually grounded and they have no influence on the output signal. Operational amplifier as used in integrator may be used as part of a positive or negative feedback amplifier or as an adder or subtractor type circuit using just pure resistances in both the input and the feedback loop. As its name implies, the Op-amp Integrator is an operational amplifier circuit that causes the output to respond to changes in the input voltage over time as the op-amp produces an output voltage which may be proportional to the integral of the input voltage. In other words, the magnitude of the output signal may be determined by the length of time a voltage may be present at its input as the current through the feedback loop charges or discharges the capacitor as the required negative feedback occurs through the capacitor. Input voltage (Vin) may represent the input signal to controller such as one or more of sensor datum 108 and/or attitude error 304. Output voltage (Vout) may represent output voltage such as one or more outputs like rate setpoint 332. When a step voltage, Vin may be firstly applied to the input of an integrating amplifier, the uncharged capacitor (C) has very little resistance and acts a bit like a short circuit allowing maximum current to flow via the input resistor, Rin as potential difference exists between the two plates. No current flows into the amplifiers input and point X may be a virtual earth resulting in zero output. As the impedance of the capacitor at this point may be very low, the gain ratio of $X_C/R_{IN}$ may be also very small giving an overall voltage gain of less than one, (voltage follower circuit). As the feedback capacitor, C begins to charge up due to the influence of the input voltage, its impedance Xc slowly increase in proportion to its rate of charge. The capacitor charges up at a rate determined by the RC time constant of the series RC network. Negative feedback forces the op-amp to produce an output voltage that maintains a virtual earth at the op-amp's inverting input. Since the capacitor may be connected between the op-amp's inverting input (which may be at virtual ground potential) and the op-amp's output (which may be now negative), the potential voltage developed across the capacitor slowly increases causing the charging current to decrease as the impedance of the capacitor increases. This results in the ratio of Xc/Rin increasing producing a linearly increasing ramp output voltage that continues to increase until the capacitor may be fully charged. At this point the capacitor acts as an open circuit, blocking any more flow of DC current. The ratio of feedback capacitor to input resistor ($X_C/R_{IN}$) may be now infinite resulting in infinite gain. The result of this high gain, similar to the op-amps open-loop gain, may be that the output of the amplifier goes into saturation as shown below. (Saturation occurs when the output voltage of the amplifier swings heavily to one voltage supply rail or the other with little or no control in between). The rate at which the output voltage increases (the rate of change) may be determined by the value of the resistor and the capacitor, "RC time constant." By changing this RC time constant value, either by changing the value of the Capacitor (C) or the Resistor (R), the time in which it takes the output voltage to reach saturation can also be changed for example. Inner loop controller 300 may include a double integrator, consistent with the description of an integrator with the entirety of this disclosure. Single or double integrators consistent with the entirety of this disclosure may include analog or digital circuit components. Inner loop controller 300 may include Ki operational amplifier 324. Inner loop controller 300 may include lead-lag filters 328 consistent with the description of lead-lag filters herein below. Inner loop controller 300 may include lift lever input 332 as described herein below. Inner loop controller 300 may include Schedule on lift lever 336 as described herein below.

With continued reference to FIG. 3, inner loop controller 300 may include pitch rate damping. Adding pitch rate damping with the elevators may be the least intrusive form of augmentation that has been suggested. In this scheme, the elevator input may be a sum of the pilot input (as in fully manual flight) and a component that arrests pitch rate as measured by the sensor 104. The scheduling on the lift lever may be such that in forward flight (with 0 assisted lift), the full damping may be active. As the lift lever rises above some value (set to 0.1), the damping rolls off so that very low airspeed behavior may be handled entirely by the attitude controller. The higher this value may be set, the more active the elevator damping will be at low-speed flight (i.e., flight with substantial assisted lift). The saturation on the damping term ensures that the pilot has some amount of control authority regardless of what the augmentation attempts to do. With this design, as with the baseline design, there may be no blending between modes required during acceleration from lift assisted flight to fully wing-borne flight. Additionally, there may be no control discontinuity as the lift fans turn off and stow.

With continued reference to FIG. 3, an alternative augmentation strategy may be to close a pitch rate loop with the control surfaces. If one chooses to use this, note that in order to avoid blending between control modes while accelerating from low-speed flight to wing-borne flight, the control system commanding the lift rotors must also be rate command rate hold (RCRH) (as opposed to the nominal attitude command attitude hold (ACAH)). An RCRH low airspeed controller potentially increases pilot workload substantially. Also note that the gains appropriate for this controller change substantially across an electric aircraft's range of cruise airspeeds (as elevator effectivity changes with dynamic pressure). Since the lift lever will be all the way down during cruise, lift lever can no longer use this signal as a proxy for airspeed. Since using airspeed as an input would introduce an additional low reliability system, the system would be forced to select constant gains that produce a stable system at all reasonable airspeeds. The resulting system would have poor performance at low airspeeds. It may be possible to approximate airspeed in cruise from knowledge of the pusher performance and the operating speed and torque. Such an estimate of airspeed would likely be sufficient to enable the scheduling of gains on airspeed, which would result in less conservative design, and higher performance. For the purposes of controlling a vehicle, computing device 112 are interested in the aerodynamic forces that the lift rotors can provide. However, since the aerodynamic forces and torques that the rotors generate are a function of speed, and the lift rotors have substantial inertia, simply passing the corresponding steady state torque commands to the motor will result in a slow thrust response. If this substantial phase lag may be not compensated for, performance will be severely limited. Because computing device 112 have a good understanding of the physics involved, computing device 112 can apply a dynamic inverse of the rotor model to the steady state torque signals in order to obtain better speed tracking, and therefore better thrust tracking. Intuitively, this dynamic inverse adds a "kick" forward when the incoming signal increases sharply and adds a "kick" backwards when the incoming signal decreases sharply. Once the car may be at speed, one likely only needs one quarter throttle to maintain speed, which suggests that holding one quarter throttle for a sufficiently long time starting from a low speed would eventually accelerate the car to the desired speed. Of course, if one uses full throttle to get up to speed, and then returns to quarter throttle to hold speed, a faster response can be achieved. This may be the core idea of what the dynamic inverse does. To apply a dynamic inverse, computing device 112 first generate a model based on Euler's equation in 1 dimension. Eventually, the torque command that computing device 112 send to the motor will be a sum of a softened dynamic inverse of the motor inertia, and an approximation of the aerodynamic torque as below. First, computing device 112 will determine the value of the inertia dynamic inverse term. When computing device 112 inverts the inertia-only model (i.e. obtain the output→input response rather than the input→output response), computing device 112 will end up with a pure derivative, which has an infinite high frequency response, and may be thus not desirable. However, if computing device 112 passed a desired speed through this transfer function (given below), the resulting torque output would perfectly reproduce the desired speed. To make this work on a real system with torque limits, computing device 112 will add a first order low pass filter in series with the dynamic inverse sI. If the motors had unlimited torque capability, the resulting dynamics from input to motor speed would be just the low pass dynamics. Note that a motor speed command may be present in this expression. However, computing device 112 would like to avoid closing a speed loop on the lift motors. The decision to not close a speed loop was made on the belief that the thrust-torque relationship was more constant than the thrust-speed relationship for edgewise flight. This may be not the case; both relationships vary similarly with edgewise airspeed according to DUST simulations. This decision may be re-evaluated in the future. However, because speed may be the only state of the system, computing device 112 may be forced to generate some speed as input to this filter. Note that this speed does not have to be particularly accurate—there are no loops being closed on it, and this dynamic inverse decays to 0 quickly after the input signal stops changing. An appropriate means to generate this pseudo-reference speed may be to use the well-known approximation for the static speed-torque relationship for a fan: Using this relationship, computing device 112 can compute the approximate steady state speed that corresponds to a given torque input. Then, this speed signal may be passed through the dynamic inverse of the inertia only system. If this was the only torque that was applied to the lift motors in a vacuum (i.e., no aero drag), the lift rotors would track speeds reasonably well. Of course, this may be not the case, and computing device 112 must still account for the aerodynamic torque. If computing device 112 could always apply the exact aerodynamic torque experienced by the fan (but in the opposite sense) with the motor, any additional input would "see" only the inertia of the fan and motor. If this additional input may be the inertia-only dynamic inverse, then computing device 112 would obtain the desired first order low pass response in speed. Consider the following non-limiting example of bootstrapping. If computing device 112 assumes that computing device 112 has a good approximation of aerodynamic torque and motor saturation does not engage, then the motor speed response (and therefore the aero torque, approximately) will be a first order low pass filter, with a time constant. This tells us that computing device 112 can approximate the aerodynamic torque by passing the steady state torque command through a similar first order transfer function. The combination of this filtered steady state torque and dynamic inversion of the approximated corresponding speed may be shown below. To implement this in discrete time, the transfer functions are discretized using the Tustin, or Bilinear transform. Setting the time constants involves simulation of the system subject to different size and direction of input changes about different operating points. These time constants are tweaked to make the fans spin up as quickly as possible over a range of inputs. Intuitively, an excessively large time constant results in a slow response. However, a very short time constant also results in a slow response. With a very short time constant, the amplitude of the initial kick from the dynamic inverse may be very large, but also very short in duration. As a result of motor saturation, the total achieved energy increase from the kick may be low. An intermediate value of time constant (set to approximately 0.13) provides a faster response than either extreme. Due to the nature of the dynamic inverse, this system amplifies noise in the steady state torque command. To avoid this becoming a nuisance while the aircraft may be grounded, the dynamic inverse term may be scheduled on the position of the lift lever in the same way as the inner loop gains, but with a lower threshold. That may be, for 0 lift lever input, there may be 0 dynamic inversion contribution. This contribution ramps up linearly to full at 5% lift lever input. This inertia compensation (or something functionally similar), which may be essentially a lead-lag filter, but with physically derived pole and zero locations, may be essential to the high-performance operation of any vehicle with slow control actuators. Without this, the phase lag introduced by the actuators makes it impossible to achieve bandwidth sufficient for satisfactory handling qualities. For well-flown transitions, the lift lever position may be a good proxy for airspeed, which directly determines the effectiveness of the conventional control surfaces. This follows from the fact that at a fixed angle of attack, dynamic pressure on the wing and unpowered lift are linearly related. Therefore, in order to maintain altitude (which a pilot would tend to do), one would need to lower the lift lever as airspeed increases. In the case that a pilot were to rapidly pull up on the lift lever not in accordance with a decrease in airspeed, a pilot's control inputs would produce more than nominal control moment on the vehicle due to lift fan gains not being scheduled down and high dynamic pressure. In simulation, this scenario has been shown to be non-catastrophic, although it will likely be somewhat violent as the vehicle accelerates upwards rapidly and experiences some attitude transients. It may be easy to understand that each motor can only output a torque between some lower limit and some upper limit. If computing device 112 draw the area that corresponds to these available motor commands for the 2-fan system, computing device 112 find that a "box" may be formed. If computing device 112 assume a linear torque-thrust relationship, then so long as the motors do not rotate on the body, the map from this acceptable box in the motor torque space to the acceptable box in the space where the axes are vehicle level upward thrust and torque may be linear. Therefore, the shape can only be scaled, flipped, and rotated, but straight edges remain straight, and the number of vertices cannot change. With this transformation done, computing device 112 can now readily determine if a particular commanded force and torque combination may be possible to achieve. Suppose that computing device 112 chooses to prioritize vehicle level torque over force. In the case that the force and torque combination may be inside the box, no saturation occurs—the mixer may be able to achieve the request, and no prioritization may be needed. Suppose instead that some points with the desired torque are within the box, but none of these points have the desired force. Algorithmically, computing device 112 first get the achieved torque to match the desired torque as closely as possible. Then, that value may be locked down, and then subject to that constraint, computing device 112 matches the desired thrust as closely as possible. In this case, the desired torque is achieved, but the desired thrust is not. Mathematically, this is two sequentially solved linear programs (linear objective, linear constraints). Because computing device 112 knew the map from motor torques to vehicle torques, and because that map is invertible, computing device 112 can now apply the inverse of this map to get a motor torque command from the point computing device 112 identified in the vehicle torque space. Since the point is inside the box in the vehicle torque space, it is guaranteed to also be inside the box in the motor torque vector space, and thus guarantees that the resulting torque commands will be within the limits of the motors. Note that computing device 112 have not only resolved the motor saturation, computing device 112 also know how much force and torque computing device 112 are trying to produce (i.e. Computing device 112 haven't blindly done some clipping/rescaling of the motor signals). While this example uses only two dimensions, the principle may be the same in higher dimensions. The solution method used may be slightly different than what may be shown here, but the concept may be the same. Finally, it is important to note that throughout this process, computing device 112 has assumed that torque corresponds to thrust. This may be only true in the case of steady state operation. Because the lift fans or one or other propulsors take a substantial amount of time to spin up, this assumption may be not necessarily accurate. As a result, the mixer's estimate of achieved moment may be not accurate for rapidly changing inputs without inertia compensation. Computing device 112 can use a behavioral model of the lift fans or speed feedback to better approximate the true moment acting on the aircraft due to powered lift.

Figure 4:
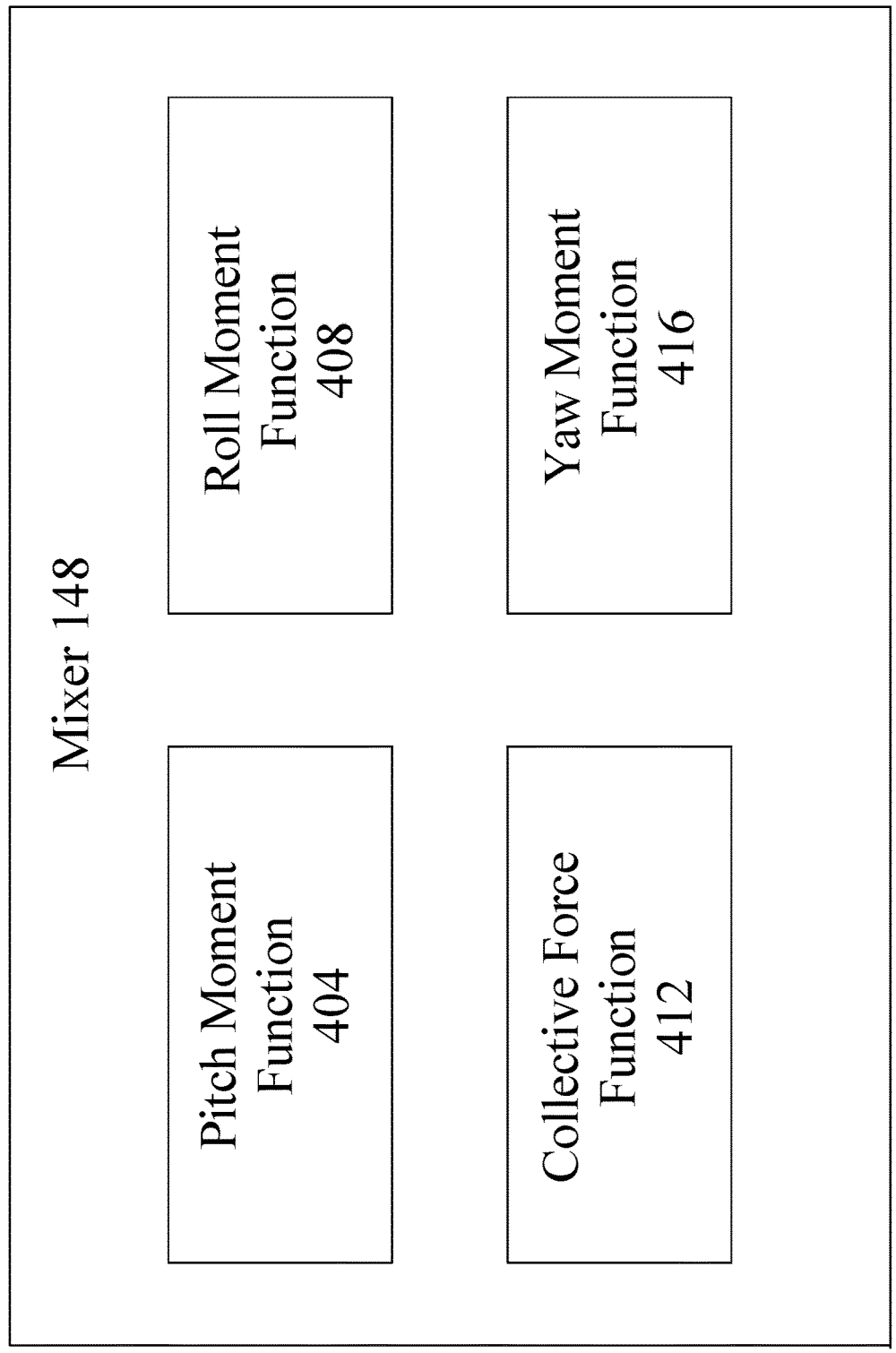
FIG. 4 is a block diagram illustrating an exemplary embodiment of a mixer.

Referring now to FIG. 4, mixer 148 is presented. As previously disclosed, solving at least an optimization problem may include solving sequential problems relating to vehicle-level inputs to at least a propulsor, namely pitch, roll, yaw, and collective force. Mixer 148 may solve at least an optimization problem in a specific order. An exemplary sequence is presented here in FIG. 4. According to exemplary embodiments, mixer 148 may solve at least an optimization problem wherein the at least an optimization problem includes a pitch moment function 404; optimization problem may be a nonlinear program. Solving may be performed using a nonlinear program and/or a linear program. In a non-limiting embodiment, mixer 148 may solve at least an optimization problem wherein solving at least an optimization program may include solving a roll moment function 408 utilizing a nonlinear program to yield the desired amount of roll moment as a function of the desired amount of pitch moment. In a non-limiting embodiment, mixer 148 may solve at least an optimization problem wherein solving at least an optimization program may include solving a collective force function 412 utilizing a nonlinear program to yield the desired amount of collective force as a function of the desired amount of pitch moment and the desired amount of roll moment. In a non-limiting embodiment, mixer 148 may solve at least an optimization problem wherein solving at least an optimization program may include solving a yaw moment function 416 utilizing a nonlinear program to yield the desired amount of yaw moment, as a function of the desired amount of pitch moment, the desired amount of roll moment, and the desired amount of collective force. One of ordinary skill in the art, after reading the entirety of this disclosure, will appreciate that any force program may be implemented as a linear or non-linear program, as any linear program may be expressed as a nonlinear program.

Figure 5:
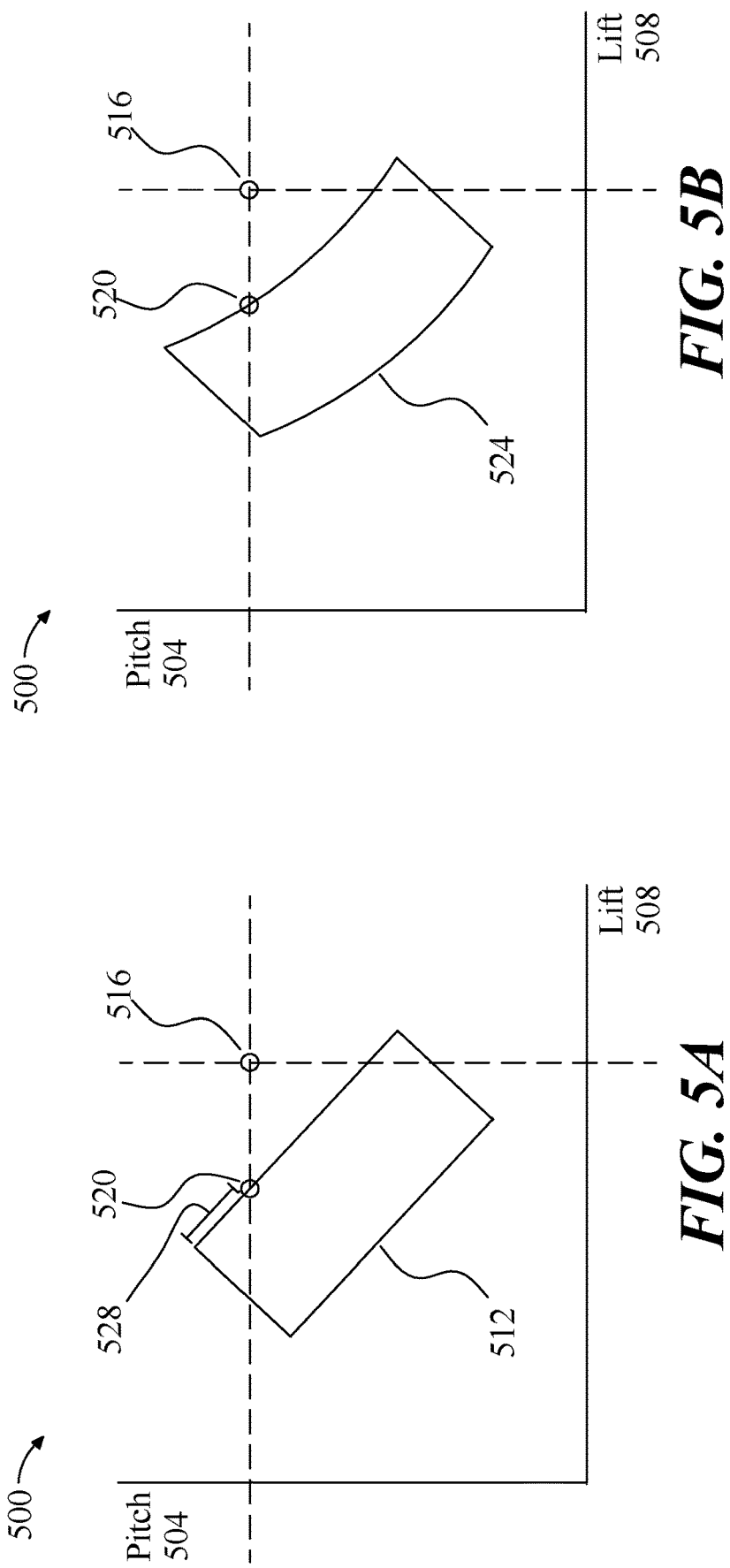
FIGS. 5A and 5B are graphical representations illustrating the herein disclosed system for torque allocation in an electric aircraft, without and with inertial compensation, respectively.

Referring now to FIG. 5A, torque allocator 500 is presented in graphical form. Torque allocator 500 may be disposed fully or partially within mixer 148 as disclosed herein. Torque allocator 500 may include one or more computing devices as described herein. Torque allocator 500 may be a separate component or grouping of components from those described herein. Torque allocator 500 may be configured to allocate a portion of total possible torque amongst one or more propulsors based on relative priority of a plurality attitude control commands and desired aircraft maneuver. In a non-limiting illustrative example, torque allocation between two attitude control components (e.g., pitch and roll or roll and yaw) may be based on the relative priorities of those two attitude control components. Priority refers to how important to the safety of the aircraft and any users while performing the attitude control component is relative to the other attitude control commands. Priority may also refer to the relative importance of each attitude control component to accomplish one or more desired aircraft maneuvers. For example, pitch attitude control component may be the highest priority, followed by roll, lift, and yaw attitude control components. In another example, the relative priority of the attitude components may be specific to an environment, aircraft maneuver, mission type, aircraft configuration, or other factors, to name a few. Torque allocator may set the highest priority attitude control component torque allocation as close as possible given the torque limits as described in this disclosure to the original command for the higher-priority attitude control component, in the illustrative example, pitch, then project to the value possible for the lower priority attitude control component, in this case, lift. The higher priority attitude control component in the first torque allocation may be the attitude control component with the highest overall priority. This process is then repeated with lower priority attitude control component from the above comparison and the next highest down the priority list. In a non-limiting illustrative example, the next two-dimensional torque allocation problem solved would include lift and roll attitude control commands. In embodiments, the lower priority attitude command component has already been set form the previous two-dimensional torque allocation, so this is projecting the closest possible value for the third-level attitude command (roll in this example). This process would repeat again for the third and fourth attitude components, in this non-limiting example, roll and yaw attitude control components. Since roll is prioritized over yaw, the roll attitude control command would be preserved, and yaw would be sacrificed as a function of the vehicle torque limits as described herein. After the sequence of two-dimensional attitude control component torque allocation are completed and four prioritized attitude component commands are set, one or more components may send out commands to flight control surfaces/propulsors to generate the set torque values allocated in the foregoing process. As a non-limiting example of one step in the torque allocation process, FIG. 5A illustrates a pitch axis 504 and lift axis 508. Pitch axis 504 represents the command or plurality of attitude commands inputted to mixer 148 as described herein. Pitch axis 504 may be conditioned or altered to be inputted to mixer 148. For example, and without limitation, initial vehicle torque signal may include pitch and lift commands within plurality of attitude commands. Torque allocator 500 may also receive at least a vehicle torque limit 512, which may be represented without limitation by a box plotted within the pitch and lift axes. A point where pitch command and lift command intersect may represent initial vehicle torque signal 516 as projected onto exemplary graph of pitch and lift axes, which may be the same or similar to initial vehicle torque signal as disclosed in the entirety of this disclosure. Torque allocator 500 utilizes prioritization data as described in the entirety of this disclosure to solve this two-dimensional problem by preserving the higher priority command and sacrificing the lower priority command. This prioritization preservation process may be illustrated, as a non-limiting example by placement of modified attitude command 520, wherein the pitch command was preserved (horizontally translated and therefore unchanged from the initial command), while the lift command was lessened to bring the modified attitude command within vehicle torque limits 512 (the box). Modified attitude command 520, as discussed in the entirety of this disclosure, may be further combined, modified, conditioned, or otherwise adjusted to produce allocation command datum 156 to the plurality of propulsors. Remaining vehicle torque 528 represents the remaining torque capability in one or more propulsors before, during, and after an aircraft maneuver. Remaining vehicle torque 528 may include an individual propulsor's remaining torque capability, one or more of pitch, roll, yaw, and lift, capabilities of one or more propulsors, the remaining vehicle-level torque or power for subsequent maneuvers. Remaining vehicle torque may be displayed to a pilot or user in the graphic presented here in FIG. 5A. The above-described is a non-limiting example of one step in the torque allocation process.

Referring now to FIG. 5B, torque allocator 500 is again presented in graphical form of a two-dimensional plot of pitch vs. lift with inertia compensation. Torque allocator 500 is presented in graphical form. Torque allocation process may be similar, or the same process as described above in regard to FIG. 5A, with the torque limits adjusted for inertia compensation. Torque allocator 500 may be disposed fully or partially within mixer 148 as disclosed herein. Torque allocator 500 may include one or more computing devices as described herein. Torque allocator 500 may be a separate component or grouping of components from those described herein. FIG. 5B includes pitch axis 504 and lift axis 508. Pitch axis 504 represents the command or plurality of attitude commands inputted to mixer 148 as described herein. Pitch axis 504 may be conditioned or altered to be inputted to mixer 148. For example, and without limitation, initial vehicle torque signal may include pitch and lift commands within plurality of attitude commands. Torque allocator 500 also receives at least a vehicle torque limit 524 represented by the box plotted within the pitch and lift axes. Here in FIG. 5B, instead of the box being made of straight linear sides, the inertia compensation as previously discussed creates curved limits, wherein certain plurality of attitude commands may be allowed whereas without inertia compensation they would be outside of the limits represented by the rectangle in FIG. 5A. Where the pitch command and lift command intersect is the initial vehicle torque signal 516, which may be the same or similar to initial vehicle torque signal as disclosed in the entirety of this disclosure. Torque allocator 500 utilizes prioritization data as described in the entirety of this disclosure to solve this two-dimensional problem by preserving the higher priority command and sacrificing the lower priority command. This prioritization preservation process is shown by the placement of modified attitude command 520, wherein the pitch command was preserved (horizontally translated and therefore unchanged from the initial command), while the lift command was lessened to bring the modified attitude command within vehicle torque limits 524 (the box). Modified attitude command 520 effectively commands the amount of torque to one or more propulsors to accomplish the closest vehicle level torque to initial vehicle torque signal as possible given certain limits, maneuvers, and aircraft conditions. Modified attitude command 520, as discussed in the entirety of this disclosure, may be further combined, modified, conditioned, or otherwise adjusted to produce allocation command datum 156 to the plurality of propulsors. Remaining vehicle torque represents the remaining torque capability in one or more propulsors before, during, and after an aircraft maneuver. Remaining vehicle torque may include an individual propulsor's remaining torque capability, one or more of pitch, roll, yaw, and lift, capabilities of one or more propulsors, the remaining vehicle-level torque or power for subsequent maneuvers. Remaining vehicle torque may be displayed to a pilot or user in the graphic presented here in FIG. 5A.

Figure 6:
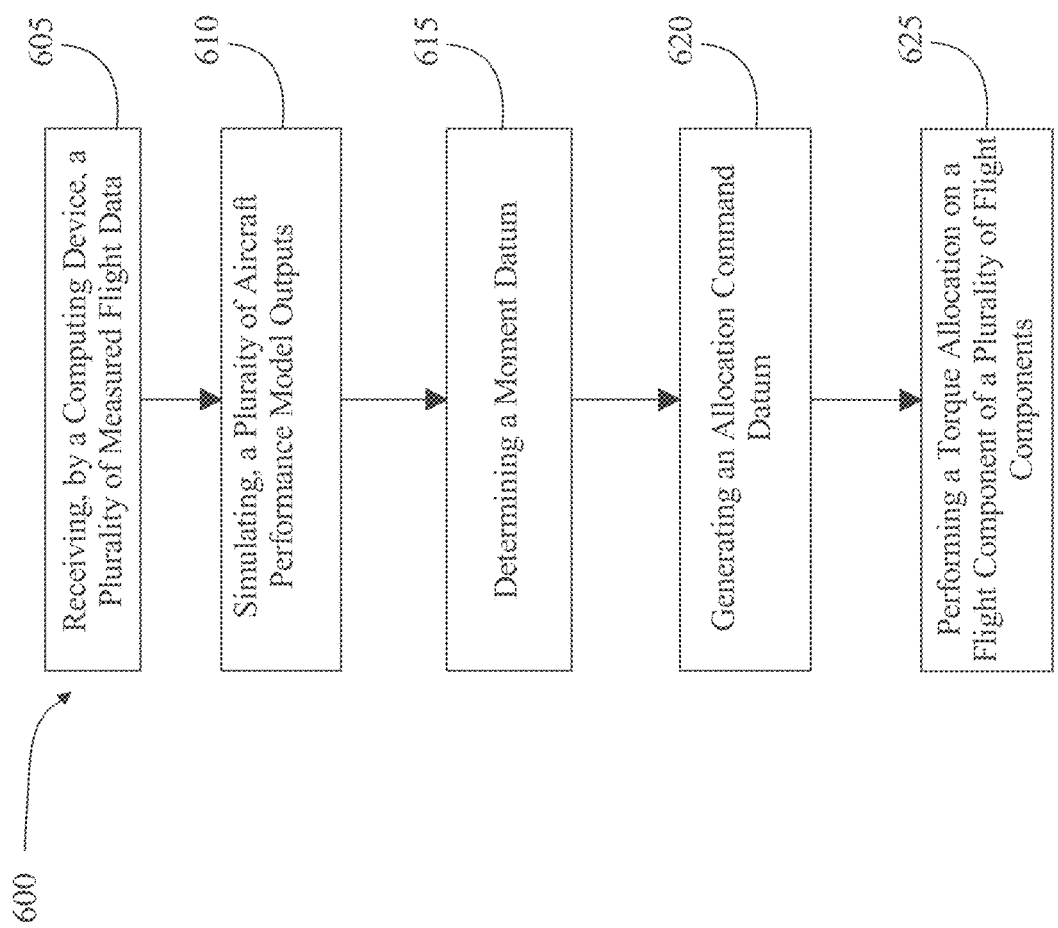
FIG. 6 is a flow chart of an exemplary embodiment of a method of flight control using simulator data for an electric aircraft.

Now referring to FIG. 6, a flow chart of an exemplary embodiment of a method 600 of flight control using simulator data for an electric aircraft is presented. Method 600, at step 605, includes receiving, by a computing device, a plurality of measured flight data. The computing device may include any computing device as described herein. The plurality of measured flight data may include any plurality of measured flight data as described herein. In a non-limiting embodiment, receiving the plurality of measured flight data may include receiving an input datum and a desired command. In a non-limiting embodiment, step 605 may include detecting the plurality of measured flight data and transmitting the plurality of measured flight data to the computing device as a function of a sensor. The sensor may include any sensor as described herein.

With continued reference to FIG. 6, method 600 may further include transmitting the plurality of measure flight data to the computing device as a function of a physical CAN bus unit. Physical CAN bust unit may include any physical CAN bus unit as described herein. In a non-limiting embodiment, the computing device may include a plurality of physical CAN bus units configured to receive any datum. Persons skilled in the art, upon reviewing the entirety of this disclosure, will be aware of the various methods of receiving and transmitting and data for the purposes as described in the entirety of this disclosure.

With continued reference to FIG. 6, method 600, at step 610, includes simulating, by a computing device, a plurality of aircraft performance model outputs as a function of the plurality of measured flight data. In a non-limiting embodiment, the computing device may include a flight simulator. The flight simulator may include any flight simulator as described herein. The plurality of aircraft performance mode outputs may include any plurality of aircraft performance model outputs as described herein. In a non-limiting embodiment, step 610 may include simulating at least a battery performance model. The at least a battery performance model may include any battery performance model as described herein. In a non-limiting embodiment, simulating the least a battery performance model may include simulating a thermal performance of a battery of an aircraft performance model output of the plurality of aircraft performance model outputs. The thermal performance may include any thermal performance as described herein. In a non-limiting embodiment, step 610 may include generating an expected aircraft performance model output. The expected aircraft performance model output may include any expected aircraft performance model output as described herein.

With continued reference to FIG. 6, step 610 may further include generating an aerodynamic model output. Generating the aerodynamic model output may include identifying the ideal, preferred, and/or optimal aircraft performance model output of the plurality of aircraft performance model output. The aerodynamic model output may include any aerodynamic model output as described herein. In a non-limiting embodiment, generating the aerodynamic model output may include selecting, by the computing device, a training set as a function each measured flight data and aircraft performance model output wherein the training set includes an aircraft performance model output correlated to an element of flight movement data. The training set may include any training set as described herein. The element of flight movement data may include any element of flight movement data as described herein. In a non-limiting embodiment, step 610 may further include generating, using a supervised machine-learning algorithm, an aerodynamic model output based on the plurality of measured flight data and the selected training set, the aerodynamic model output including an aircraft performance model output for each measured flight data of the plurality of measured flight data.

With continued reference to FIG. 6, method 600, at step 615, includes determining a moment datum as a function of the plurality of measured flight data and the plurality of aircraft performance model outputs. The moment datum may include any moment datum as described herein. In a non-limiting embodiment, method 600 may include generating a rate setpoint by an outer loop controller as a function of the plurality of flight data and any aircraft performance model output including at least the aerodynamic model output. The outer loop controller may include any outer loop controller as described herein. The rate setpoint may include any rate setpoint as described herein. In a non-limiting embodiment, method 600 may include determining the moment datum by an inner loop function as a function of at least the rate setpoint. The inner loop controller may include any inner loop controller as described herein.

With continued reference to FIG. 6, method 600, at step 620, includes generating an allocation command datum as a function of the moment datum and the plurality of aircraft performance model outputs. The allocation command datum may include any allocation command datum as described herein.

With continued reference to FIG. 6, method 600, at step 625, include performing a torque allocation on a flight component of a plurality of flight components as a function of the allocation command and the moment datum. The torque allocation may include any torque allocation as described herein. In a non-limiting embodiment, method 600 may further include transmitting the allocation command datum to a display, wherein the display is configured to display the allocation command datum. The display may include any display as described herein.

Figure 7:
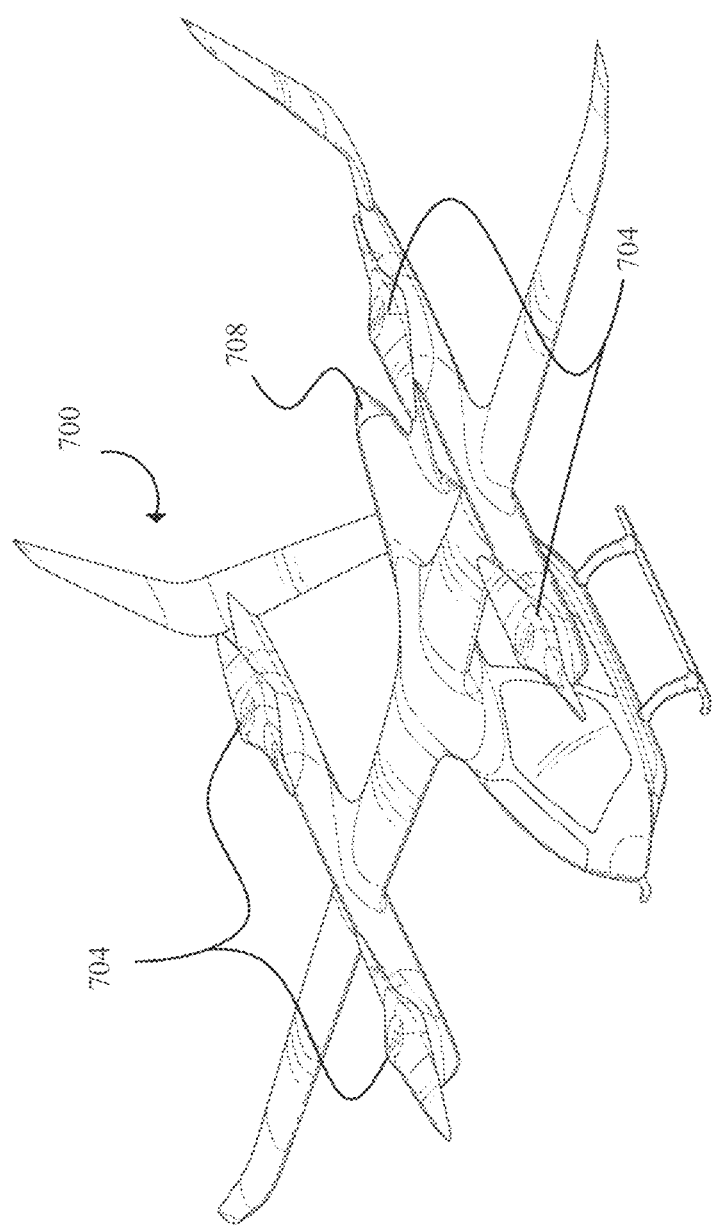
FIG. 7 is an illustration of an embodiment of an electric aircraft.

Referring now to FIG. 7, an embodiment of an electric aircraft 700 is presented. Still referring to FIG. 7, electric aircraft 700 may include a vertical takeoff and landing aircraft (eVTOL). As used herein, a vertical take-off and landing (eVTOL) aircraft may be one that can hover, take off, and land vertically. An eVTOL, as used herein, may be an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, may be where the aircraft generated lift and propulsion by way of one or more powered rotors connected with an engine, such as a "quad copter," multi-rotor helicopter, or other vehicle that maintains its lift primarily using downward thrusting propulsors. Fixed-wing flight, as described herein, may be where the aircraft may be capable of flight using wings and/or foils that generate life caused by the aircraft's forward airspeed and the shape of the wings and/or foils, such as airplane-style flight. Control forces of the aircraft are achieved by conventional elevators, ailerons and rudders during fixed wing flight. Roll and Pitch control forces on the aircraft are achieved during transition flight by increasing and decreasing torque, and thus thrust on the four lift fans. Increasing torque on both left motors and decreasing torque on both right motors leads to a right roll, for instance. Likewise, increasing the torque on the front motors and decreasing the torque on the rear motors leads to a nose up pitching moment. Clockwise and counterclockwise turning motors torques are increased and decreased to achieve the opposite torque on the overall aircraft about the vertical axis and achieve yaw maneuverability.

With continued reference to FIG. 7, a number of aerodynamic forces may act upon the electric aircraft 700 during flight. Forces acting on an electric aircraft 700 during flight may include, without limitation, thrust, the forward force produced by the rotating element of the electric aircraft 700 and acts parallel to the longitudinal axis. Another force acting upon electric aircraft 700 may be, without limitation, drag, which may be defined as a rearward retarding force which may be caused by disruption of airflow by any protruding surface of the electric aircraft 700 such as, without limitation, the wing, rotor, and fuselage. Drag may oppose thrust and acts rearward parallel to the relative wind. A further force acting upon electric aircraft 700 may include, without limitation, weight, which may include a combined load of the electric aircraft 700 itself, crew, baggage, and/or fuel. Weight may pull electric aircraft 700 downward due to the force of gravity. An additional force acting on electric aircraft 700 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 700 are designed to be as lightweight as possible. Reducing the weight of the aircraft and designing to reduce the number of components may be essential to optimize the weight. To save energy, it may be useful to reduce weight of components of an electric aircraft 700, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 700 and/or propulsors.

Referring still to FIG. 7, Aircraft may include at least a vertical propulsor 704 and at least a forward propulsor 708. A forward propulsor may be a propulsor that propels the aircraft in a forward direction. Forward in this context may be not an indication of the propulsor position on the aircraft; one or more propulsors mounted on the front, on the wings, at the rear, etc. A vertical propulsor may be a propulsor that propels the aircraft in an upward direction; one of more vertical propulsors may be mounted on the front, on the wings, at the rear, and/or any suitable location. A propulsor, as used herein, may be a component or device used to propel a craft by exerting force on a fluid medium, which may include a gaseous medium such as air or a liquid medium such as water. At least a vertical propulsor 704 may be a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 7, at least a forward propulsor 708 as used in this disclosure may be a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 704 and at least a forward propulsor 708 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft may be in compression. Propulsors may include at least a motor mechanically connected to at least a first propulsor as a source of thrust. A motor may include without limitation, any electric motor, where an electric motor may be a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 7, during flight, a number of forces may act upon the electric aircraft. Forces acting on an aircraft 700 during flight may include thrust, the forward force produced by the rotating element of the aircraft 700 and acts parallel to the longitudinal axis. Drag may be defined as a rearward retarding force which may be caused by disruption of airflow by any protruding surface of the aircraft 700 such as, without limitation, the wing, rotor, and fuselage. Drag may oppose thrust and acts rearward parallel to the relative wind. Another force acting on aircraft 700 may include weight, which may include a combined load of the aircraft 700 itself, crew, baggage and fuel. Weight may pull aircraft 700 downward due to the force of gravity. An additional force acting on aircraft 700 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

With continued reference to FIG. 7, at least a portion of an electric aircraft may include at least a propulsor. A propulsor, as used herein, may be a component or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. The more air pulled behind an aircraft, the greater the force with which the aircraft may be pushed forward. Propulsor may include any device or component that consumes electrical power on demand to propel an electric aircraft in a direction or other vehicle while on ground or in-flight.

With continued reference to FIG. 7, in an embodiment, at least a portion of the aircraft may include a propulsor, the propulsor may include a propeller, a blade, or any combination of the two. The function of a propeller may be to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of the propellers may, for example, be fixed, manually variable to a few set positions, automatically variable (e.g. a "constant-speed" type), or any combination thereof. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates.

With continued reference to FIG. 7, in an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Figure 8:
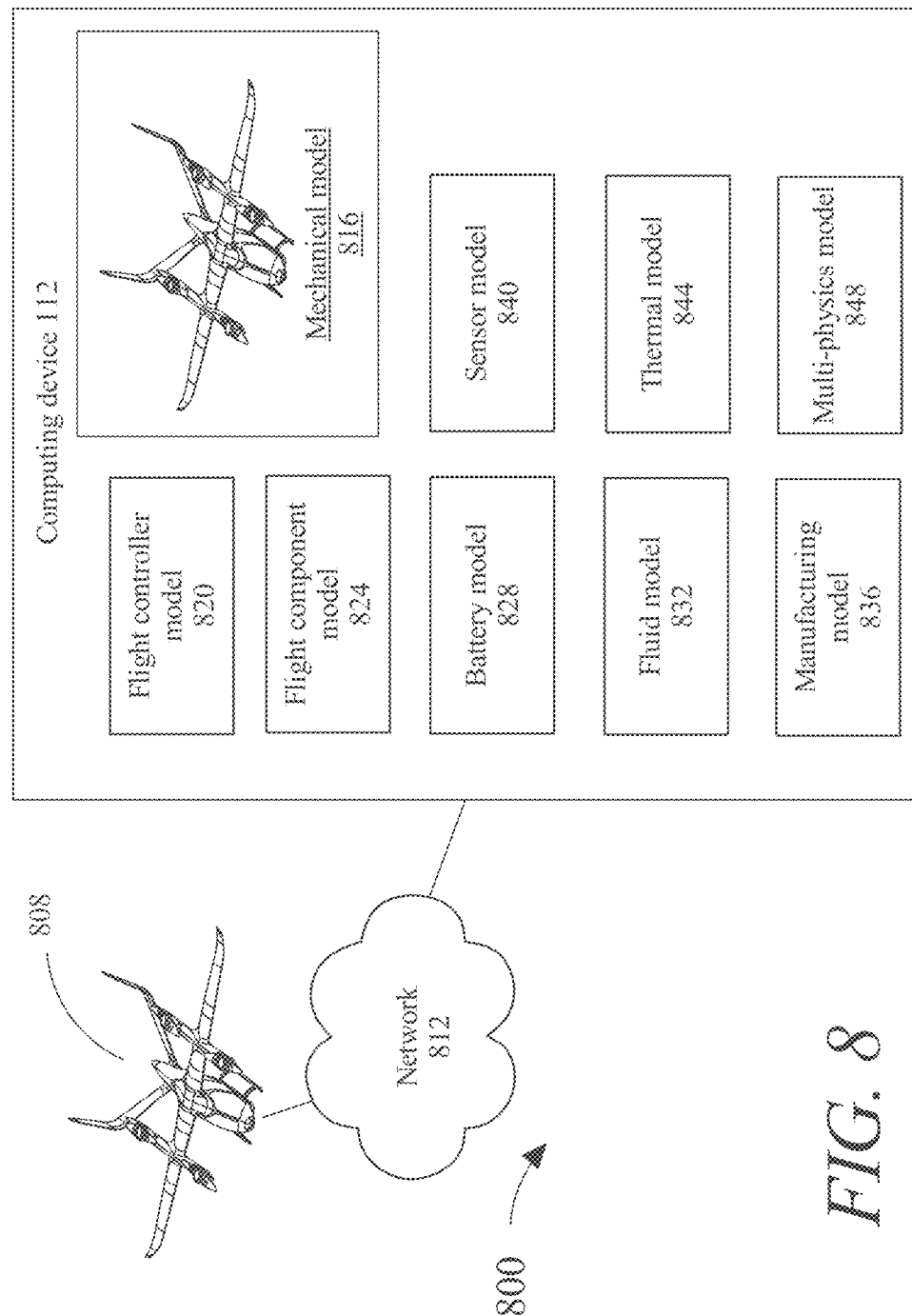
FIG. 8 is a diagram of an exemplary embodiment of an aircraft performance model for an electric aircraft.

Referring to FIG. 8, a diagram of an exemplary embodiment of an aircraft performance model 800 for an electric aircraft is illustrated. aircraft performance model 800 may include a computing device 112. As used in this disclosure, a "aircraft performance model" is an up-to-date virtual representation of a physical component or process, for instance and without limitation an aircraft such as an eVTOL aircraft. Aircraft performance model 800 may represent an aircraft 808. In some cases, aircraft 808 may include an individual aircraft. Alternatively or additionally, in some cases, aircraft performance model 808 may represent a class, type, lot, or aggregate of aircraft 808. In some cases, aircraft performance model 808 may represent an aircraft which is incomplete, or in a pre-production design stage. In some cases, aircraft performance model 808 may represent aircraft 808 which are in use. In some cases, an aircraft performance model may include any of an aircraft performance model prototype (DTP), an aircraft performance model instance (DTI), and an aircraft performance model aggregate (DTA). DTP consists of designs, analyses, and processes to realize a physical component. In some cases, a DTP exists before there is a physical component. DTI is aircraft performance model of any of an individual instance of component, for instance after the component has been manufactured. DTA is an aggregation of DTIs whose data and information can be used for interrogation about a physical component, prognostics, and learning. In some embodiments, specific information contained in aircraft performance model may be driven by use cases. Aircraft performance model may be a logical construct, meaning that actual data and information constituting the aircraft performance model may be contained in any number of other computer devices and/or software. An aircraft performance model 800 may include an integrated multi-physics, multiscale, probabilistic simulation of an as-built vehicle or system that uses best available physical models, sensor updates, fleet history, and the like, to mirror an eVTOL or at least an aircraft component. In some cases, aircraft performance model 800 aircraft performance model may be a virtual instance of an aircraft 808 (twin) that is continually updated with the aircraft's performance, maintenance, and health status data, for example throughout the aircraft's life cycle.

With continued reference to FIG. 8, in some cases, aircraft performance model 800 may include a at least a network 812 communicatively connecting at least an aircraft component of aircraft 808 and computing device 112. At least a network 812 may include any network described in this disclosure, including without limitation an avionic mesh network. Computing device 112 may likewise include any computing device described in this disclosure. Aircraft performance model 800 may include any number of models, simulations, digital representations, and the like. Computing device 112 may access, process and/or store some or all models constituting aircraft performance model 800.

With continued reference to FIG. 8, in some embodiments aircraft performance model 800 may include a mechanical model 816 of aircraft 808. Mechanical model 816 may include, for example without limitation, computer-aided design (CAD) models, 3D models, 2D models, material models, finite element analysis (FEA) models, manufacturing models, Stress/vibrational/spectral analysis models, and the like.

With continued reference to FIG. 8, in some embodiments aircraft performance model 800 may include a flight controller model 820. Flight controller model 820 may include a logical model of any controller, processor, or computing device operative on or in service to function of aircraft 808. For example, flight controller model 820 may model any flight controller system or subsystem described in this disclosure. In some cases, modeling of an integrated circuit of flight controller may include hardware emulation. For example, an integrated circuit may be modeled by an emulator configured to emulate an integrated circuit, controller hardware/firmware, FPGA gate arrangement, and the like. In some cases, electronic design automation (EDA) may be used to model at least a portion of flight controller model 820. Additionally non-limiting exemplary electronic circuit simulation and modeling methods include transistor simulation, logic simulation, behavioral simulation, technology CAD, electromagnetic field solvers, and the like. In some cases, flight controller model 820 may be configured to allow for functional verification of at least a portion of a flight controller. In some cases, aircraft performance model 800 may model at least a portion and/or all computing devices within or utilized by an aircraft 808. electrical vertical take-off and landing vehicles may require many computing devices, not only in-flight controllers, but also for function of other flight components.

With continued reference to FIG. 8, in some embodiments, aircraft performance model 800 may include flight component model 824. In some cases, flight component model 824 may be configured to model at least a flight component associated with aircraft. Flight component may include any flight component described in this disclosure.

With continued reference to FIG. 8, in some embodiments, aircraft performance model 800 may include a battery model 828. Battery model 828 may include any model related to at least property, characteristic, or function of a battery located within aircraft. In some cases, battery model 828 may include a model of a battery controller, management, and/or monitoring system. Disclosure related to battery management for eVTOL aircraft may be found in patent application Ser. Nos. 17/108,798 and 17/111,002, entitled "PACK LEVEL BATTERY MANAGEMENT SYSTEM" and "ELECTRICAL DISTRIBUTION MONITORING SYSTEM FOR AN ELECTRIC AIRCRAFT," respectively, each of which is incorporated herein by reference in its entirety. In some cases, a battery model 828 may include an electrochemical model of battery, which may be predictive of energy efficiencies and heat generation and transfer of at least a battery. In some cases, a battery model 828 may be configured to predict battery lifetime, given known battery parameters, for example measured battery performance, temperature, utilization, and the like.

With continued reference to FIG. 8, in some embodiments, aircraft performance model 800 may include a fluid model 832. A fluid model 832 may model fluids within and/or interacting with aircraft, for example environmental air. In some cases, fluid model may include computation fluid dynamic modeling. Exemplary computation fluid dynamics modeling software includes ANSYS® Fluids from ANSYS® of Canonsburg, Pa., U.S.A.

With continued reference to FIG. 8, in some embodiments, aircraft performance model 800 may include a manufacturing model 836. In some cases, a manufacturing model may include representations of an actual manufacturing process for example for an individual aircraft 808. In some cases, manufacturing model 836 may include reference to an aircraft history file, manufacturing records, and/or maintenance records. For example, in some cases, deviations for a standard manufacturing and/or maintenance process may be included in a manufacturing model 836. In some case, a manufacturing model may include information related to traceability of at least an aircraft component, for example manufacturer, model, and lot number for given critical aircraft components.

With continued reference to FIG. 8, in some embodiments, aircraft performance model 800 may include a sensor model 840. A sensor model 840 may model at least a sensor of aircraft 808. Sensor may include any sensor described in this disclosure. In some cases, sensor model 840 may emulate and/or simulate expected measurements for at least a sensor on aircraft 808. Alternatively and/or additionally in some embodiments, sensor model 840 may be informed by actual measurements communicated at least a sensor of aircraft 808. In some cases, a difference between an expected measurement and an actual measurement may be found, for example by sensor model 840; the difference may be used to improve aircraft performance model 800 performance, for example trough data-based model updating and/or recalibration. In some cases, sensor model 840 may be used to sense, detect, or otherwise measure performance of any other model of aircraft performance model 800 or aircraft 808.

With continued reference to FIG. 8, in some embodiments, aircraft performance model 800 may include a thermal model 844. Exemplary thermal modeling software includes without limitation COMSOL from COMSOL, Inc. of Burlington, Mass., U.S.A. Thermal modeling may include analytical model, for example finite-elemental analysis based upon Fourier conduction, Newton's law of Cooling, and/or Kirchhoff's law of thermal radiation.

With continued reference to FIG. 8, in some embodiments, aircraft performance model 800 may include a multi-physics model 848. A multi-physics model 848 may include analytical models of any well-known or otherwise predictable physical phenomenon. In some cases, a multi-physics model 848 may include elements or portions of any other model described in this disclosure. A multi-physics model 848 may, for example, include electromagnetic radiation models. A multi-physics model may predict optical and/or electrical performance of one or more aircraft components. Multi-physics modeling may include coupled processes or systems involving more than one simultaneously occurring physical field. A multi-physics model may include many physical models. A multi-physics model may include partial differential equations and/or tensor analysis. A multi-physics model may include any model of a physical process, such as without limitation heat transfer (thermo-), pore water movement (hydro-), concentration field (concentro or diffuso/convecto/advecto), stress and strain (mechano-), dynamics (dyno-), chemical reactions (chemo- or chemico-), electrostatics (electro-), neutronics (neutro-), magnetostatics (magneto-), and the like.

With continued reference to FIG. 8, in some embodiments, aircraft performance model 800 may model, simulate, predict, and/or determine an aspect of aircraft 808 using machine-learning processes, including any machine-learning process described in this application. Aircraft performance model 800 may include analytical models, for example those based upon known physical laws and phenomena, such as Newton's laws of motion. Alternatively and/or additionally, aircraft performance model 800 may include data-driven models based largely on observed data, for example Monte-Carlo modeling for simulation and modeling and/or machine-learning processes. In some cases, aircraft performance model 800 may be constituted of digital threads. According to some embodiments, a digital thread may be considered a lowest level design and specification for a digital representation of a physical item. Use of digital threads may, in some cases, ensure deep coherence between models of an aircraft performance model 800. In some cases, an aircraft performance model 800 may include a design equation and/or design matrix. A design equation may mathematically represent some or all design requirements and parameters associated with a particular design, for example an aircraft 808.

Figure 9:
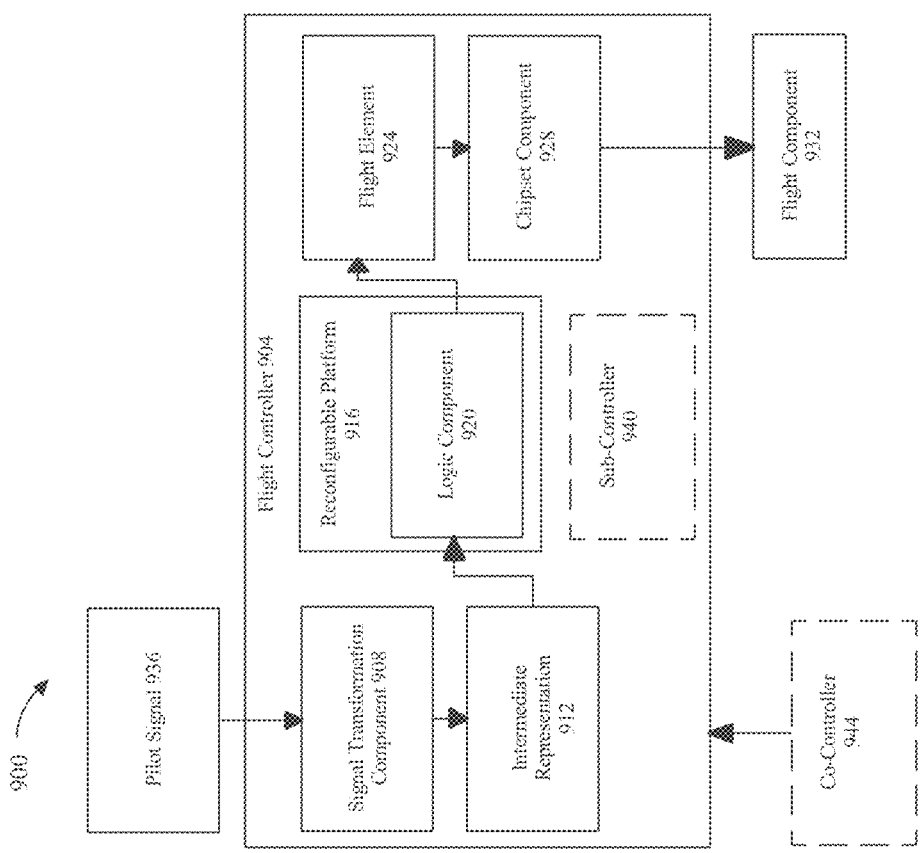
FIG. 9 is a block diagram of an exemplary embodiment of a flight controller.

Now referring to FIG. 9, an exemplary embodiment 900 of a flight controller 904 is illustrated. As used in this disclosure a "flight controller" is a computing device of a plurality of computing devices dedicated to data storage, security, distribution of traffic for load balancing, and flight instruction. Flight controller 904 may include and/or communicate with any computing device as described in this disclosure, including without limitation a microcontroller, microprocessor, digital signal processor (DSP) and/or system on a chip (SoC) as described in this disclosure. Further, flight controller 904 may include a single computing device operating independently, or may include two or more computing device operating in concert, in parallel, sequentially or the like; two or more computing devices may be included together in a single computing device or in two or more computing devices. In embodiments, flight controller 904 may be installed in an aircraft, may control the aircraft remotely, and/or may include an element installed in the aircraft and a remote element in communication therewith.

In an embodiment, and still referring to FIG. 9, flight controller 904 may include a signal transformation component 908. As used in this disclosure a "signal transformation component" is a component that transforms and/or converts a first signal to a second signal, wherein a signal may include one or more digital and/or analog signals. For example, and without limitation, signal transformation component 908 may be configured to perform one or more operations such as preprocessing, lexical analysis, parsing, semantic analysis, and the like thereof. In an embodiment, and without limitation, signal transformation component 908 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 908 may include transforming one or more low-level languages such as, but not limited to, machine languages and/or assembly languages. For example, and without limitation, signal transformation component 908 may include transforming a binary language signal to an assembly language signal. In an embodiment, and without limitation, signal transformation component 908 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 9, signal transformation component 908 may be configured to optimize an intermediate representation 912. As used in this disclosure an "intermediate representation" is a data structure and/or code that represents the input signal. Signal transformation component 908 may optimize intermediate representation as a function of a data-flow analysis, dependence analysis, alias analysis, pointer analysis, escape analysis, and the like thereof. In an embodiment, and without limitation, signal transformation component 908 may optimize intermediate representation 912 as a function of one or more inline expansions, dead code eliminations, constant propagation, loop transformations, and/or automatic parallelization functions. In another embodiment, signal transformation component 908 may optimize intermediate representation as a function of a machine dependent optimization such as a peephole optimization, wherein a peephole optimization may rewrite short sequences of code into more efficient sequences of code. Signal transformation component 908 may optimize intermediate representation to generate an output language, wherein an "output language," as used herein, is the native machine language of flight controller 904. For example, and without limitation, native machine language may include one or more binary and/or numerical languages.

In an embodiment, and without limitation, signal transformation component 908 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri-Hocquenghem (BCH) coding, multidimensional parity-check coding, and/or Hamming codes. An ECC may alternatively or additionally be based on a convolutional code.

In an embodiment, and still referring to FIG. 9, flight controller 904 may include a reconfigurable hardware platform 916. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 916 may be reconfigured to enact any algorithm and/or algorithm selection process received from another computing device and/or created using machine-learning processes.

Still referring to FIG. 9, reconfigurable hardware platform 916 may include a logic component 920. As used in this disclosure a "logic component" is a component that executes instructions on output language. For example, and without limitation, logic component may perform basic arithmetic, logic, controlling, input/output operations, and the like thereof. Logic component 920 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 920 may be organized according to Von Neumann and/or Harvard architecture as a non-limiting example. Logic component 920 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 920 may include one or more integrated circuit microprocessors, which may contain one or more central processing units, central processors, and/or main processors, on a single metal-oxide-semiconductor chip. Logic component 920 may be configured to execute a sequence of stored instructions to be performed on the output language and/or intermediate representation 912. Logic component 920 may be configured to fetch and/or retrieve the instruction from a memory cache, wherein a "memory cache," as used in this disclosure, is a stored instruction set on flight controller 904. Logic component 920 may be configured to decode the instruction retrieved from the memory cache to opcodes and/or operands. Logic component 920 may be configured to execute the instruction on intermediate representation 912 and/or output language. For example, and without limitation, logic component 920 may be configured to execute an addition operation on intermediate representation 912 and/or output language.

In an embodiment, and without limitation, logic component 920 may be configured to calculate a flight element 924. As used in this disclosure a "flight element" is an element of datum denoting a relative status of aircraft. For example, and without limitation, flight element 924 may denote one or more torques, thrusts, airspeed velocities, forces, altitudes, groundspeed velocities, directions during flight, directions facing, forces, orientations, and the like thereof. For example, and without limitation, flight element 924 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 924 may denote that aircraft is following a flight path accurately and/or sufficiently.

Still referring to FIG. 9, flight controller 904 may include a chipset component 928. As used in this disclosure a "chipset component" is a component that manages data flow. In an embodiment, and without limitation, chipset component 928 may include a northbridge data flow path, wherein the northbridge dataflow path may manage data flow from logic component 920 to a high-speed device and/or component, such as a RAM, graphics controller, and the like thereof. In another embodiment, and without limitation, chipset component 928 may include a southbridge data flow path, wherein the southbridge dataflow path may manage data flow from logic component 920 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 928 may manage data flow between logic component 920, memory cache, and a flight component 932. As used in this disclosure a "flight component" is a portion of an aircraft that can be moved or adjusted to affect one or more flight elements. For example, flight component 932 may include a component used to affect the aircrafts' roll and pitch which may comprise one or more ailerons. As a further example, flight component 932 may include a rudder to control yaw of an aircraft. In an embodiment, chipset component 928 may be configured to communicate with a plurality of flight components as a function of flight element 924. For example, and without limitation, chipset component 928 may transmit to an aircraft rotor to reduce torque of a first lift propulsor and increase the forward thrust produced by a pusher component to perform a flight maneuver.

In an embodiment, and still referring to FIG. 9, flight controller 904 may be configured generate an autonomous function. As used in this disclosure an "autonomous function" is a mode and/or function of flight controller 904 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 924. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 904 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 904 will control the ailerons and/or rudders. As used in this disclosure "non-autonomous mode" is a mode that denotes a pilot will control aircraft and/or maneuvers of aircraft in its entirety.

In an embodiment, and still referring to FIG. 9, flight controller 904 may generate autonomous function as a function of an autonomous machine-learning model. As used in this disclosure an "autonomous machine-learning model" is a machine-learning model to produce an autonomous function output given flight element 924 and a pilot signal 936 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 936 may denote that a pilot is controlling and/or maneuvering ailerons, wherein the pilot is not in control of the rudders and/or propulsors. In an embodiment, pilot signal 936 may include an implicit signal and/or an explicit signal. For example, and without limitation, pilot signal 936 may include an explicit signal, wherein the pilot explicitly states there is a lack of control and/or desire for autonomous function. As a further non-limiting example, pilot signal 936 may include an explicit signal directing flight controller 904 to control and/or maintain a portion of aircraft, a portion of the flight plan, the entire aircraft, and/or the entire flight plan. As a further non-limiting example, pilot signal 936 may include an implicit signal, wherein flight controller 904 detects a lack of control such as by a malfunction, torque alteration, flight path deviation, and the like thereof. In an embodiment, and without limitation, pilot signal 936 may include one or more explicit signals to reduce torque, and/or one or more implicit signals that torque may be reduced due to reduction of airspeed velocity. In an embodiment, and without limitation, pilot signal 936 may include one or more local and/or global signals. For example, and without limitation, pilot signal 936 may include a local signal that is transmitted by a pilot and/or crew member. As a further non-limiting example, pilot signal 936 may include a global signal that is transmitted by air traffic control and/or one or more remote users that are in communication with the pilot of aircraft. In an embodiment, pilot signal 936 may be received as a function of a tri-state bus and/or multiplexor that denotes an explicit pilot signal should be transmitted prior to any implicit or global pilot signal.

Still referring to FIG. 9, autonomous machine-learning model may include one or more autonomous machine-learning processes such as supervised, unsupervised, or reinforcement machine-learning processes that flight controller 904 and/or a remote device may or may not use in the generation of autonomous function. As used in this disclosure "remote device" is an external device to flight controller 904. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 9, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 904 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 9, flight controller 904 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 904. Remote device and/or FPGA may transmit a signal, bit, datum, or parameter to flight controller 904 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 904 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 9, flight controller 904 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 9, flight controller 904 may include, but is not limited to, for example, a cluster of flight controllers in a first location and a second flight controller or cluster of flight controllers in a second location. Flight controller 904 may include one or more flight controllers dedicated to data storage, security, distribution of traffic for load balancing, and the like. Flight controller 904 may be configured to distribute one or more computing tasks as described below across a plurality of flight controllers, which may operate in parallel, in series, redundantly, or in any other manner used for distribution of tasks or memory between computing devices. For example, and without limitation, flight controller 904 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 9, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 932. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 9, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 904. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 912 and/or output language from logic component 920, wherein output language may include one or more analog-to-digital conversions, low bit rate transmissions, message encryptions, digital signals, binary signals, logic signals, analog signals, and the like thereof described above in detail.

Still referring to FIG. 9, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 9, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 9, flight controller 904 may also be implemented using a "shared nothing" architecture in which data is cached at the worker, in an embodiment, this may enable scalability of aircraft and/or computing device. Flight controller 904 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, a node may include, without limitation a plurality of inputs ($x_i$) that may receive numerical values from inputs to a neural network containing the node and/or from other nodes. Node may perform a weighted sum of inputs using weights ($w_i$) that are multiplied by respective inputs ($x_i$). Additionally or alternatively, a bias (b) may be added to the weighted sum of the inputs such that an offset is added to each unit in the neural network layer that is independent of the input to the layer. The weighted sum may then be input into a function ($\varphi$), which may generate one or more outputs (y). Weight ($w_i$) applied to an input ($x_i$) may indicate whether the input is "excitatory," indicating that it has strong influence on the one or more outputs y, for instance by the corresponding weight having a large numerical value, and/or a "inhibitory," indicating it has a weak effect influence on the one more outputs (y), for instance by the corresponding weight having a small numerical value. The values of weights ($w_i$) may be determined by training a neural network using training data, which may be performed using any suitable process as described above. In an embodiment, and without limitation, a neural network may receive semantic units as inputs and output vectors representing such semantic units according to weights ($w_i$) that are derived using machine-learning processes as described in this disclosure.

Still referring to FIG. 9, flight controller may include a sub-controller 940. As used in this disclosure a "sub-controller" is a controller and/or component that is part of a distributed controller as described above; for instance, flight controller 904 may be and/or include a distributed flight controller made up of one or more sub-controllers. For example, and without limitation, sub-controller 940 may include any controllers and/or components thereof that are similar to distributed flight controller and/or flight controller as described above. Sub-controller 940 may include any component of any flight controller as described above. Sub-controller 940 may be implemented in any manner suitable for implementation of a flight controller as described above. As a further non-limiting example, sub-controller 940 may include one or more processors, logic components and/or computing devices capable of receiving, processing, and/or transmitting data across the distributed flight controller as described above. As a further non-limiting example, sub-controller 940 may include a controller that receives a signal from a first flight controller and/or first distributed flight controller component and transmits the signal to a plurality of additional sub-controllers and/or flight components.

Still referring to FIG. 9, flight controller may include a co-controller 944. As used in this disclosure a "co-controller" is a controller and/or component that joins flight controller 904 as components and/or nodes of a distributer flight controller as described above. For example, and without limitation, co-controller 944 may include one or more controllers and/or components that are similar to flight controller 904. As a further non-limiting example, co-controller 944 may include any controller and/or component that joins flight controller 904 to distributer flight controller. As a further non-limiting example, co-controller 944 may include one or more processors, logic components and/or computing devices capable of receiving, processing, and/or transmitting data to and/or from flight controller 904 to distributed flight control system. Co-controller 944 may include any component of any flight controller as described above. Co-controller 944 may be implemented in any manner suitable for implementation of a flight controller as described above.

In an embodiment, and with continued reference to FIG. 9, flight controller 904 may be designed and/or configured to perform any method, method step, or sequence of method steps in any embodiment described in this disclosure, in any order and with any degree of repetition. For instance, flight controller 904 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 10:
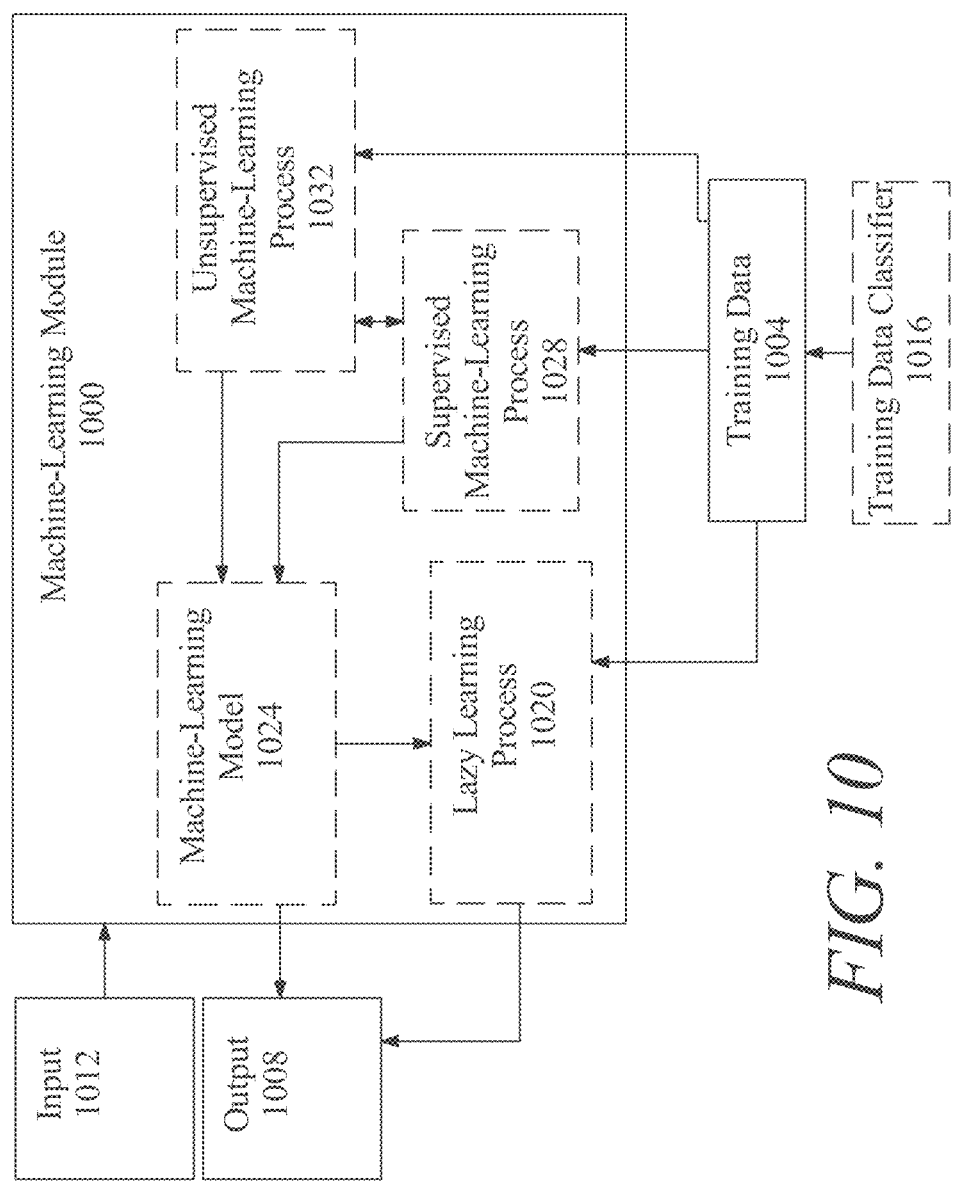
FIG. 10 is a block diagram illustrating an exemplary embodiment of a machine-learning process.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JAVASCRIPT® Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example, the plurality of measured flight data and the plurality of aircraft performance model output may be inputs and the aerodynamic model output may be an output. In another non-limiting illustrative example, the allocation command datum may be an output for a moment datum input.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1016 may classify elements of training data to various subsets of simulation data of the plurality of aircraft performance model outputs, such as a cohort of aircraft performance model outputs with varying performance levels of flight components for which a subset of training data may be selected].

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any inputs as described in the entirety of this disclosure, any outputs as described in the entirety of this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
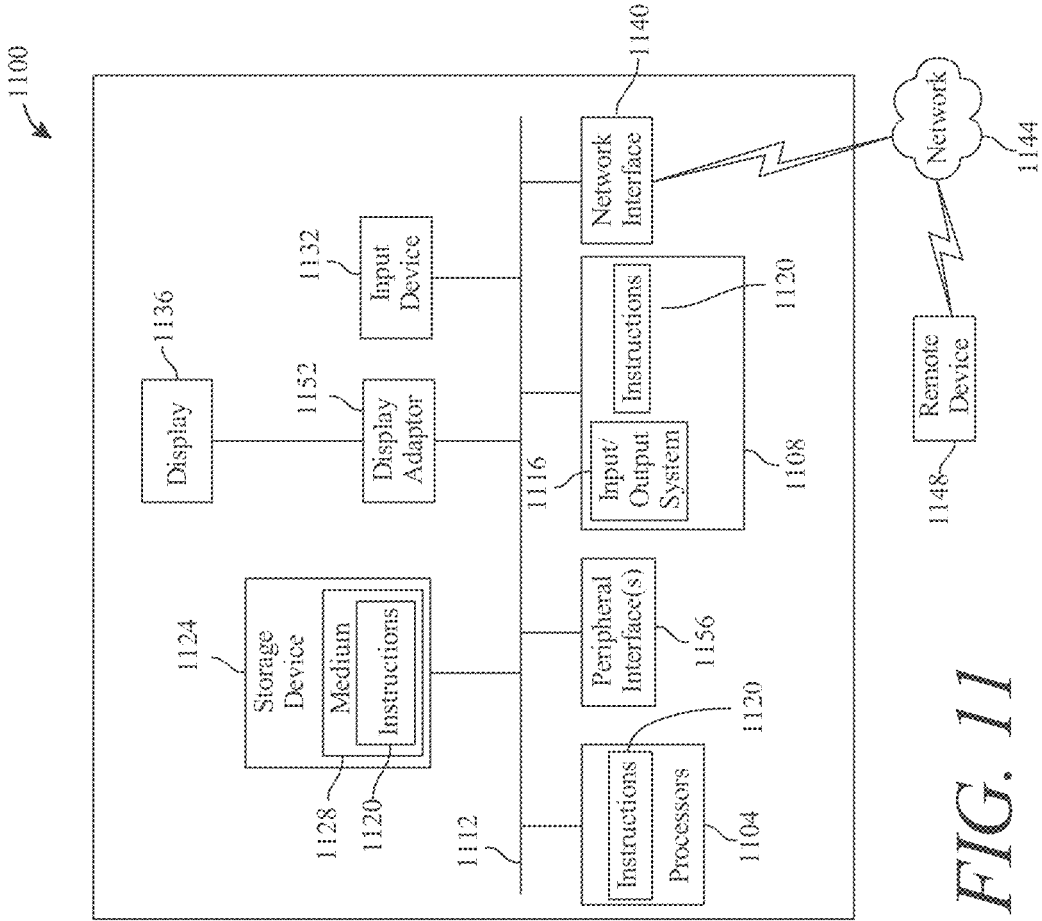
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and system according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for flight control system using simulator data for an electric aircraft, the system comprising:
   a computing device, the computing device configured to:
   receive a plurality of measured flight data comprising a desired command;
   simulate a plurality of aircraft performance model outputs as a function of a flight simulator and the plurality of measured flight data;
   generate a plurality of expected aircraft performance model outputs;
   identify a malfunctioning flight component of the electric aircraft as a function of the plurality of measured flight data and the plurality of expected aircraft performance model outputs, wherein identifying the malfunctioning flight component comprises:
   sorting the plurality of expected aircraft performance model outputs based on similarity to the measured flight data;
   determine a moment datum, wherein the moment datum is determined as a function of at least the desired command of the plurality of measured flight data and the plurality of expected aircraft performance model outputs and comprises a plurality of prioritization data, the plurality of prioritization data comprising a prioritization datum corresponding to each of the plurality of aircraft performance model outputs;
   generate an allocation command datum as a function of the moment datum and the plurality of aircraft performance model outputs; and
   perform a torque allocation on a flight component of a plurality of flight components as a function of the allocation command datum and the moment datum.

2. The system of claim 1, wherein the plurality of measured flight data further comprises an input datum.

3. The system of claim 1, wherein the plurality of aircraft performance model outputs further comprises at least a battery performance model.

4. The system of claim 3, wherein the at least battery performance model comprises a thermal performance of a battery of an aircraft performance model output of the plurality of aircraft performance model outputs.

5. The system of claim 1, wherein the computing device is further configured to generate a machine-learning model, wherein the machine-learning model is configured to receive the plurality of measured flight data as an input and output an aerodynamic model output as a function of a training data set.

6. The system of claim 1, wherein the computing device further comprises an outer loop controller, the outer loop controller configured to generate a rate setpoint as a function of the plurality of measured flight data.

7. The system of claim 6, wherein the computing device further comprises an inner loop controller, the inner loop controller configured to generate the moment datum as a function of the rate setpoint.

8. The system of claim 1, wherein the computing device further comprises a mixer, wherein the mixer is configured to determine a plurality of modified commands as a function of the moment datum and the plurality of measured flight data.

9. The system of claim 1, wherein the computing device is further configured to display a remaining vehicle torque and the allocation command datum on a display.

10. A method for flight control system using simulator data for an electric aircraft, the method comprising:
    receiving, by a computing device, a plurality of measured flight data comprising a desired command;
    simulating a plurality of aircraft performance model outputs as a function of the plurality of measured flight data;
    generating, by the computing device a plurality of expected aircraft performance model outputs;
    identifying, by the computing device, a malfunctioning flight component of the electric aircraft as a function of the plurality of measured flight data and the a plurality of expected aircraft performance model outputs, wherein identifying the malfunctioning flight component comprises:
    sorting, by the computing device, the plurality of expected aircraft performance model outputs based on similarity to the measured flight data;
    determining by the computing device, a moment datum, wherein the moment datum is determined as a function of at least the desired command of the plurality of measured flight data and the plurality of expected aircraft performance model outputs and comprises a plurality of prioritization data, the plurality of prioritization data comprising a prioritization datum corresponding to each of the plurality of aircraft performance model outputs;
    generating by the computing device, an allocation command datum as a function of the moment datum and the plurality of aircraft performance model outputs; and
    performing by the computing device, a torque allocation on a flight component of a plurality of flight components as a function of the allocation command datum and the moment datum.

11. The method of claim 10, wherein receiving the plurality of measured flight data further comprises receiving an input datum.

12. The method of claim 10, wherein simulating the plurality of aircraft performance model outputs further comprises simulating at least a battery performance model.

13. The method of claim 12, wherein simulating the at least battery performance model further comprises simulating a thermal performance of a battery of an aircraft performance model output of the plurality of aircraft performance model outputs.

14. The method of claim 10, wherein the method further comprises generating a machine-learning model, wherein the machine-learning model is configured to receive the plurality of measured flight data as an input and output an aerodynamic model output as a function of a training data.

15. The method of claim 10, wherein the method further comprises generating, by an outer loop controller, a rate setpoint as a function of the plurality of measured flight data.

16. The method of claim 15, wherein method further comprises generating, by an inner loop controller, the moment datum as a function of the rate setpoint.

17. The method of claim 10, wherein the method further comprises determining, by a mixer, a plurality of modified commands as a function of the moment datum and the plurality of measured flight data.

18. The method of claim 10, wherein the method further comprises displaying, on a display, a remaining vehicle torque and the allocation command datum.

\* \* \* \* \*